(12) United States Patent
Kimura

(10) Patent No.: US 7,352,517 B2
(45) Date of Patent: Apr. 1, 2008

(54) OPTICAL PICKUP APPARATUS

(75) Inventor: Tohru Kimura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/416,168

(22) Filed: May 3, 2006

(65) Prior Publication Data

US 2006/0250704 A1   Nov. 9, 2006

(30) Foreign Application Priority Data

May 9, 2005   (JP) .............................. 2005-136167

(51) Int. Cl.
*G02B 13/00*   (2006.01)

(52) U.S. Cl. ...................... 359/719; 359/618; 359/629; 369/112.01

(58) Field of Classification Search ................ 359/618, 359/629–640, 719; 369/112.01–112.29
See application file for complete search history.

(56) References Cited

U.S. PATENT DOCUMENTS

| | | | | |
|---|---|---|---|---|
| 6,034,939 A | * | 3/2000 | Takasawa et al. ...... | 369/112.17 |
| 6,370,104 B1 | * | 4/2002 | Chao et al. ............. | 369/112.28 |
| 6,449,235 B1 | * | 9/2002 | Kim et al. ............. | 369/112.01 |
| 7,193,954 B2 | * | 3/2007 | Yagi et al. ............. | 369/112.01 |
| 2005/0219988 A1 | * | 10/2005 | Atarashi et al. ........ | 369/112.08 |
| 2005/0226124 A1 | * | 10/2005 | Kimura et al. ......... | 369/112.08 |
| 2005/0249097 A1 | * | 11/2005 | Hashimura et al. .... | 369/112.01 |
| 2006/0018214 A1 | * | 1/2006 | Fujii et al. ............... | 369/44.37 |
| 2006/0109771 A1 | * | 5/2006 | Atarashi et al. ........ | 369/112.01 |
| 2006/0164954 A1 | * | 7/2006 | Hashimura ............. | 369/112.01 |

* cited by examiner

*Primary Examiner*—Scott J. Sugarman
*Assistant Examiner*—Darryl J. Collins
(74) *Attorney, Agent, or Firm*—Finnegan, Henderson, Farabow, Garrett & Dunner, L.L.P.

(57) ABSTRACT

An optical pickup apparatus for conducting at least recording or reproducing of information on two types of optical information recording media having protective substrates with different thicknesses, includes: a first light source for emitting a first light flux with a wavelength λ1; a first objective lens for converging the first light flux on an information recording surface of a first optical information recording medium when the optical pickup apparatus reproduces or records information for the first optical information medium; and a second objective lens for converging the first light flux on an information recording surface of a second optical information recording medium when the optical pickup apparatus reproduces or records information for the second optical information medium, wherein effective diameters of the first objective lens and the second objective lens are substantially same.

8 Claims, 10 Drawing Sheets

OPTICAL AXIS

OPTICAL AXIS

OPTICAL AXIS

OPTICAL AXIS

OPTICAL AXIS

OPTICAL AXIS

OPTICAL AXIS

OPTICAL AXIS

OPTICAL PICKUP APPARATUS

This application is based on Japanese Patent Application No. 2005-136167 filed on May 9, 2005, in Japanese Patent Office, the entire content of which is hereby incorporated by reference.

FIELD OF THE INVENTION

The present invention relates to an optical pickup apparatus recording and/or reproducing information onto/from various kinds of optical recording media.

BACKGROUND OF THE INVENTION

In recent years, tendency of a shorter wavelength of laser beam as a light source which has been used to record and/or reproduce information onto/from optical discs, has become a main stream. For example, a blue-violet semiconductor laser, a blue-SHG laser performing wavelength conversion of an infrared semiconductor laser utilizing a second harmonic wave, etc., having 400-420 nm wavelength have been made practical.

It becomes possible to record information of 15-20 GB onto an optical disc having a diameter of 12 cm by using a blue-violet laser source and a objective lens having NA (Numerical aperture) which is the same as a DVD (Digital Versatile Disc). When NA is 0.85, 23-25 GB information can be recorded onto the optical disc having a diameter of 12 cm. In this specification, the optical disc and an optical-magnetic disc using a blue-violet laser light source are called "a high density optical disc".

At this moment, two industrial standards for the high density optical disc have been proposed. One is BLU-RAY DISC (it will be called BD hereinafter) having a thickness of 0.1 mm where an objective lens having a NA 0.85, is used, and the other is HD DVD (it will be called HD hereinafter) having a thickness of 0.6 mm where the objective lens having a NA 0.65-0.67 is used. A high density optical disc player/recorder capable of recording and/or reproducing both high density discs will be necessary based on an assumption that these two high density discs based on these two industrial standards will become popular in a market in future.

It is not enough for value of an optical disc player and/or recorder to be able to record/reproduce information onto/from only a high density disc. Taking account that DVDs and CDs (compact discs) on which various kinds of information is recorded are on a marketplace, it is not enough for value of the optical disc player/recorder to be able to record/reproduce information onto/from only a high density optical disc. In order to raise a product value, it is necessary for an optical disc player/recorder to record/reproduce information not only onto/from a high density disc but also a DVD and a CD which users posses. From these backgrounds, an optical pickup for an optical disc player/recorder for high density optical discs is required to be able to appropriately record/reproduce information onto/from a high density optical disc, DVD and CD.

However, since BD is different from HD in terms of specifications such as numerical aperture and protective substrate thickness, if a common objective lens is used for conducting recording and/or reproducing of information compatibly for BD and HD, a degree of freedom for design of the objective lens is restricted, resulting in a problem of deteriorations in temperature characteristics. In contrast to this, TOKUKAI No. 2004-295983 discloses an optical pickup apparatus that can conduct recording and/or reproducing of information compatibly while securing a degree of freedom for design, by providing two objective lenses respectively for BD and HD.

However, in the optical pickup apparatus shown in TOKUKAI No. 2004-295983, there is a problem that the optical pickup apparatus is complicated in terms of a structure and is large in a size, because separate light sources are provided for respective two objective lenses.

SUMMARY OF THE INVENTION

The invention has been achieved in view of the problems stated above, and its object is to provide an optical pickup apparatus carrying an objective lens that is small in size and can conduct recording and/or reproducing of information properly for two high density optical discs each having a different protective substrate thickness and a different standard.

An optical pickup apparatus relating to the invention is one capable of conducting at least reproducing and/or recording of information for two types of optical information recording media each having a different protective substrate thickness. The optical pickup apparatus includes therein the first light source, a first objective lens used for converging a first light flux from the first light source on an information recording surface of a first optical information recording medium, and a second objective lens used for converging the first light flux from the first light source on an information recording surface of a second optical information recording medium. In the optical pickup apparatus, the first objective lens and the second objective lens satisfy a prescribed condition.

In this specification, optical discs, onto or from which require a blue-violet semiconductor laser diode or a blue-violet SHG laser to record/reproduce information is called a high density optical disc. The high density optical disc includes an optical disc, for example, BD which needs an objective optical system having a NA of 0.85 to record and/or reproduce information onto/from the optical disc and the thickness of the protective substrate of the optical disc is substantially equal to 0.1 mm, and an optical discs, for example, HD which needs an objective optical system having NA of 0.65-0.67 to record and/or reproduce information onto/from the optical disc and the thickness of the protective layer of the optical disc is substantially equal to 0.6 mm. Other than an optical disc having a protective layer on a recording surface, an optical disc having a protective substrate having a thickness of several nm to several tens nm or an optical disc having no protective substrate or no protective substrate on the recording surface are also included in the high density optical disc. In this specification, the high density optical disc includes an optical-magnetic disc which requires a blue-violet semiconductor laser diode or a blue-violet SHG laser for recording and/or reproducing information onto/from the high density optical disc as a light source.

Further, in this specification, the phrase that "thickness of protective layer is the same" means that thickness of protective layer of HD DVD being a successor of DVD, and that of DVD are within a rage of thickness respectively defined by the HD DVD standard which has high compatibility with the DVD standard and the DVD standard, and protective layer thickness of DVD, which include the difference between the thickness of DVD and the thickness of HD DVD.

In the present specification, optical discs in DVD series such as DVD-ROM, DVD-Video, DVD-Audio, DVD-RAM, DVD-R, DVD-RW, DVD+R and DVD+RW are called "DVD" generically, and optical discs in CD series such as CD-ROM, CD-Audio, CD-Video, CD-R and CD-RW are called "CD" generically.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which:

Each of FIGS. 1(a) and 1(b) shows an example of a diffractive structure;

Figure 2A:
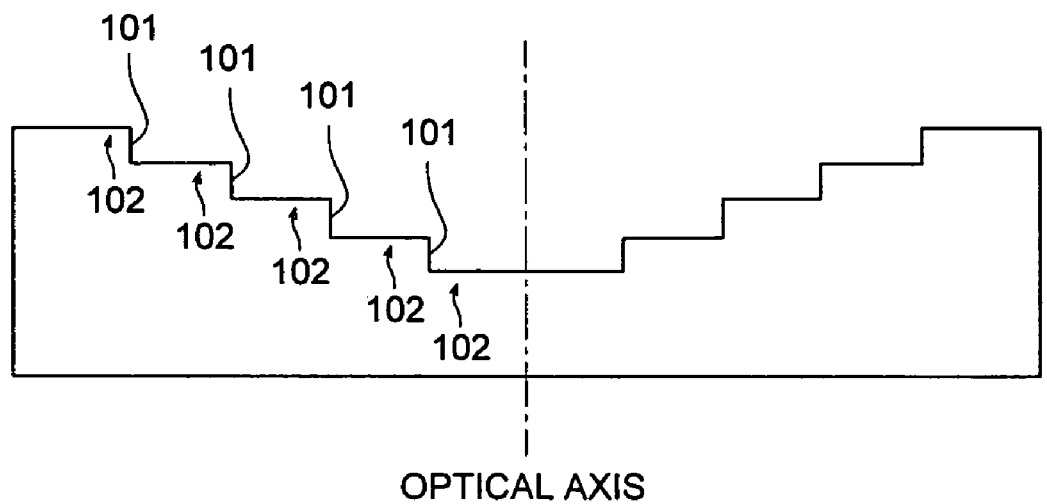
Figure 2B:
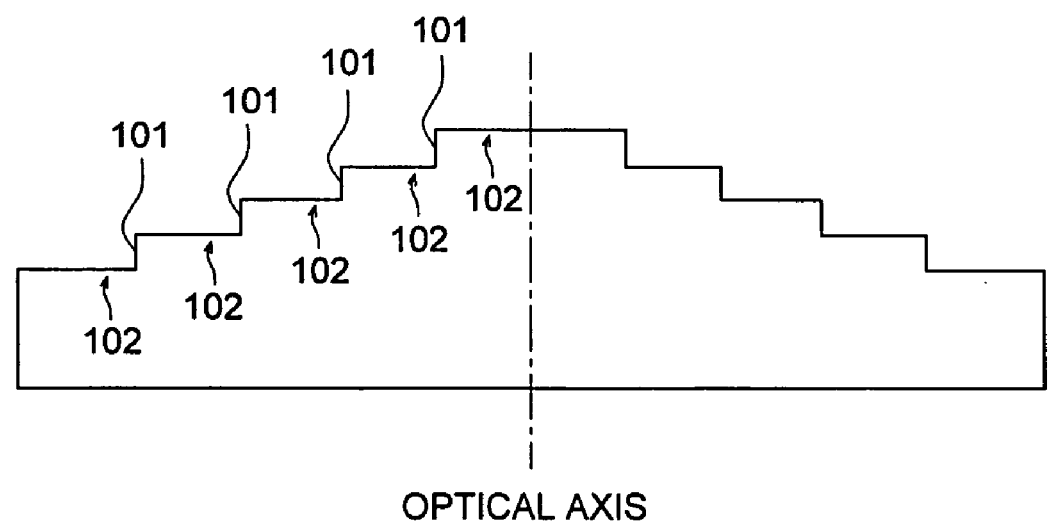
Figure 5:
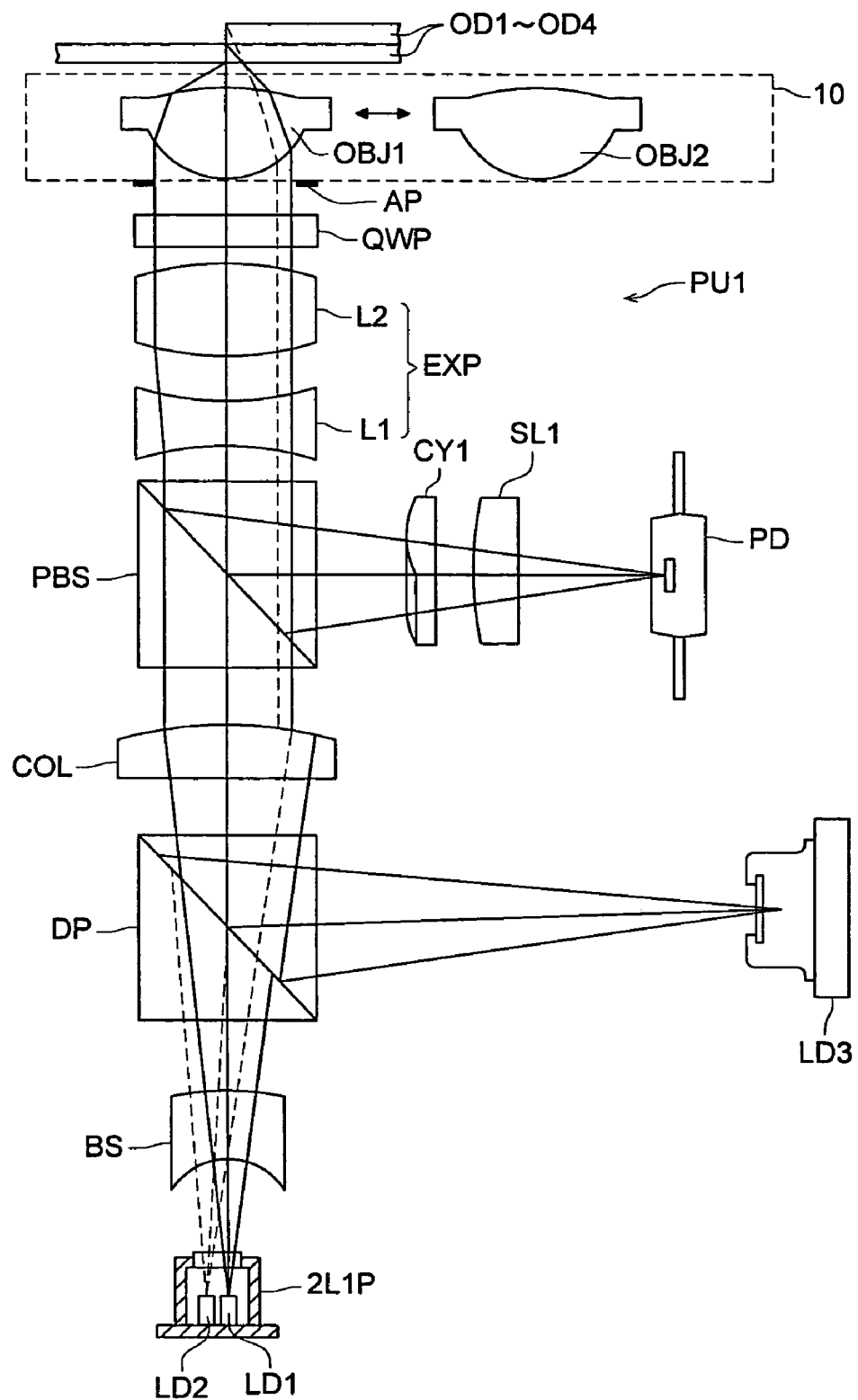
Figure 6:
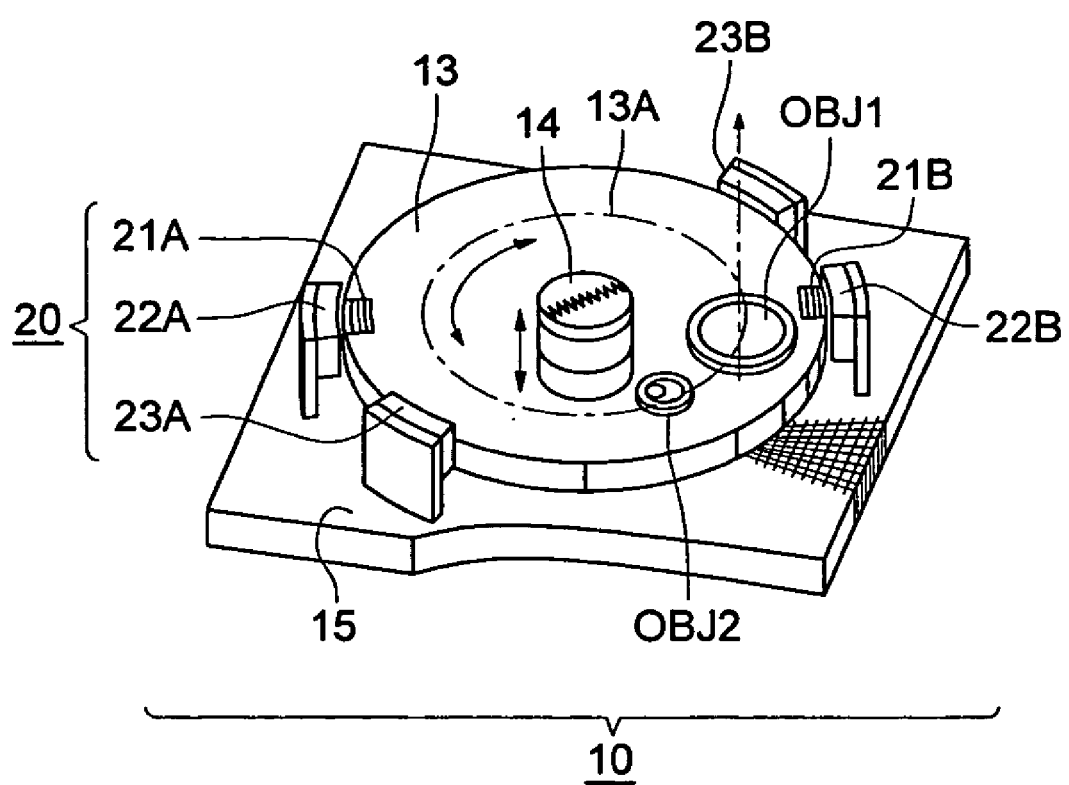
Figure 7:
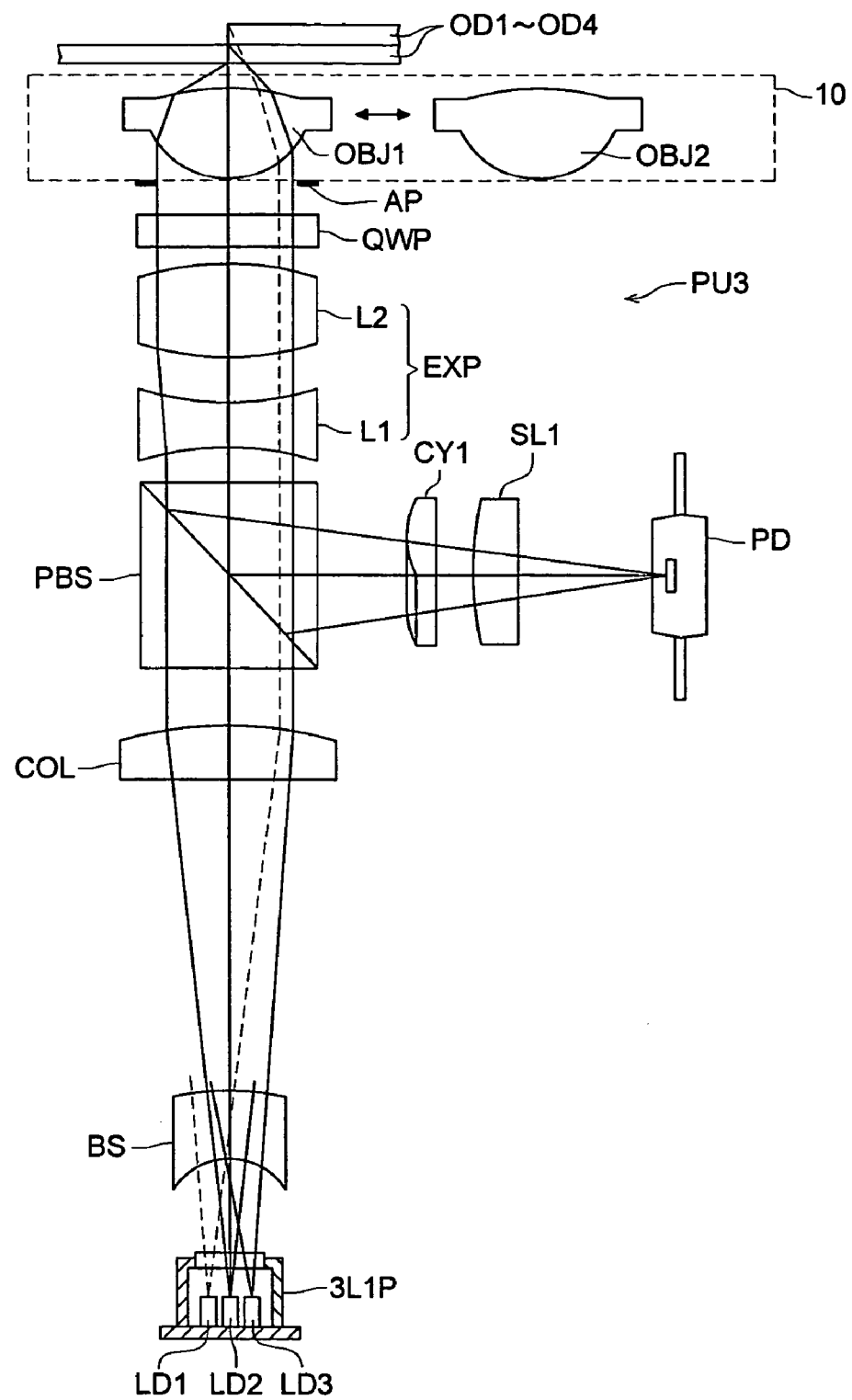
Figures 8A, 8B, 8C:
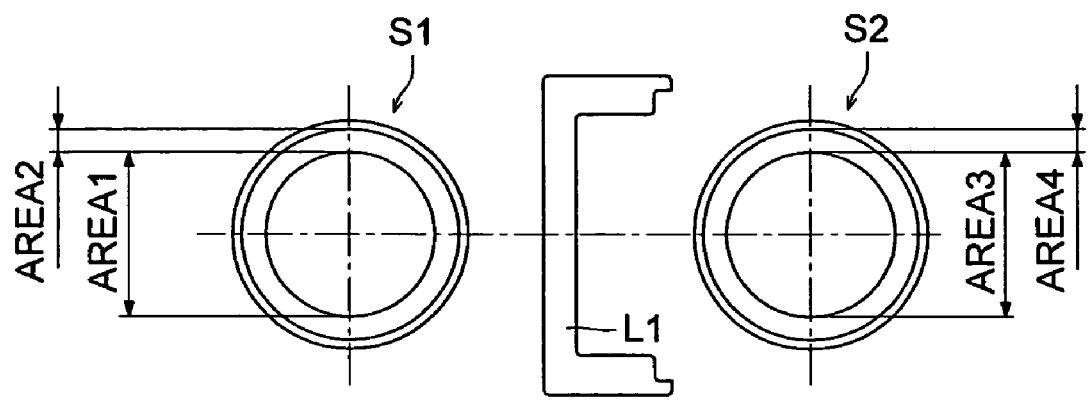
Figure 9:
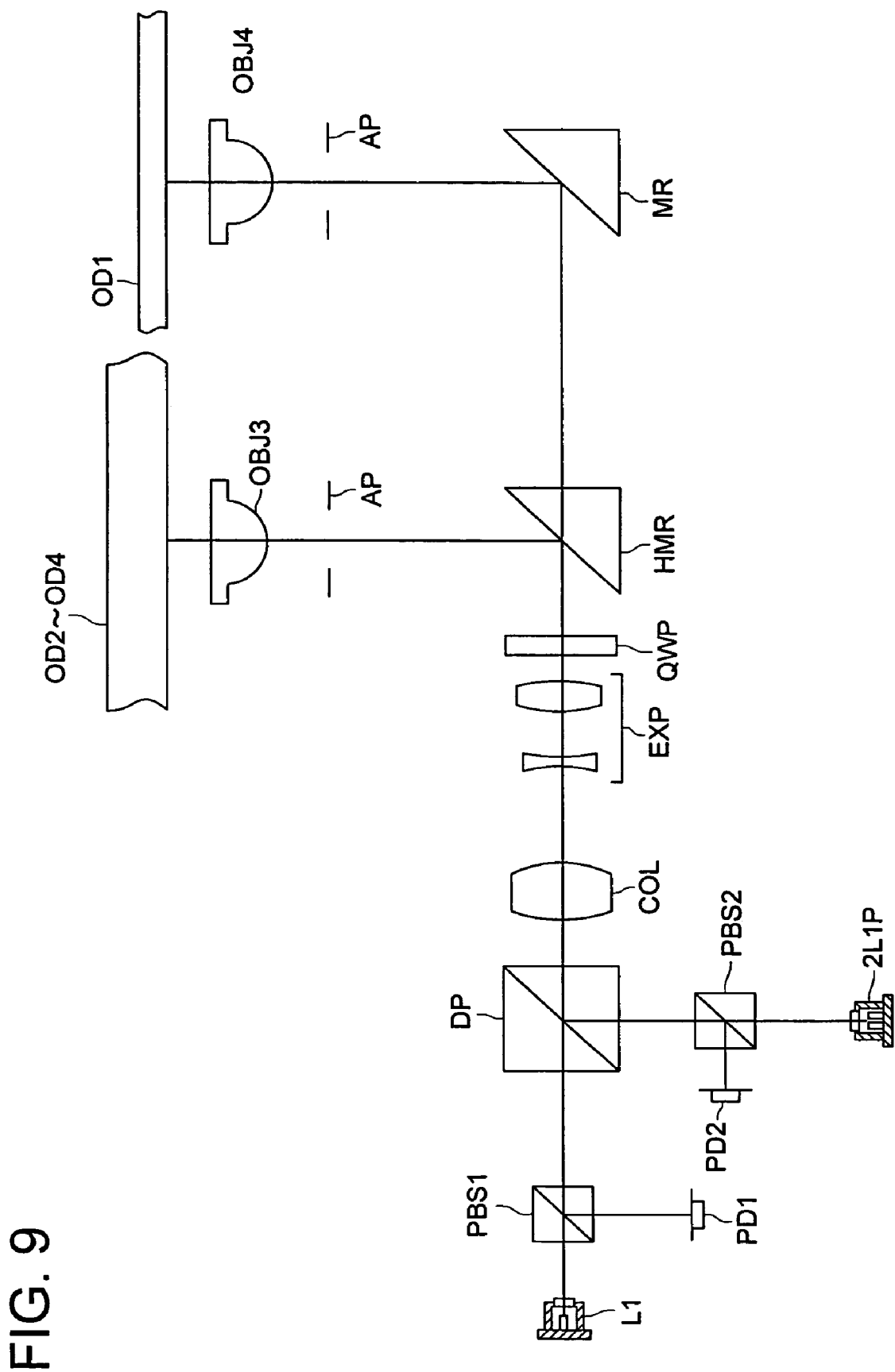
Figure 10:
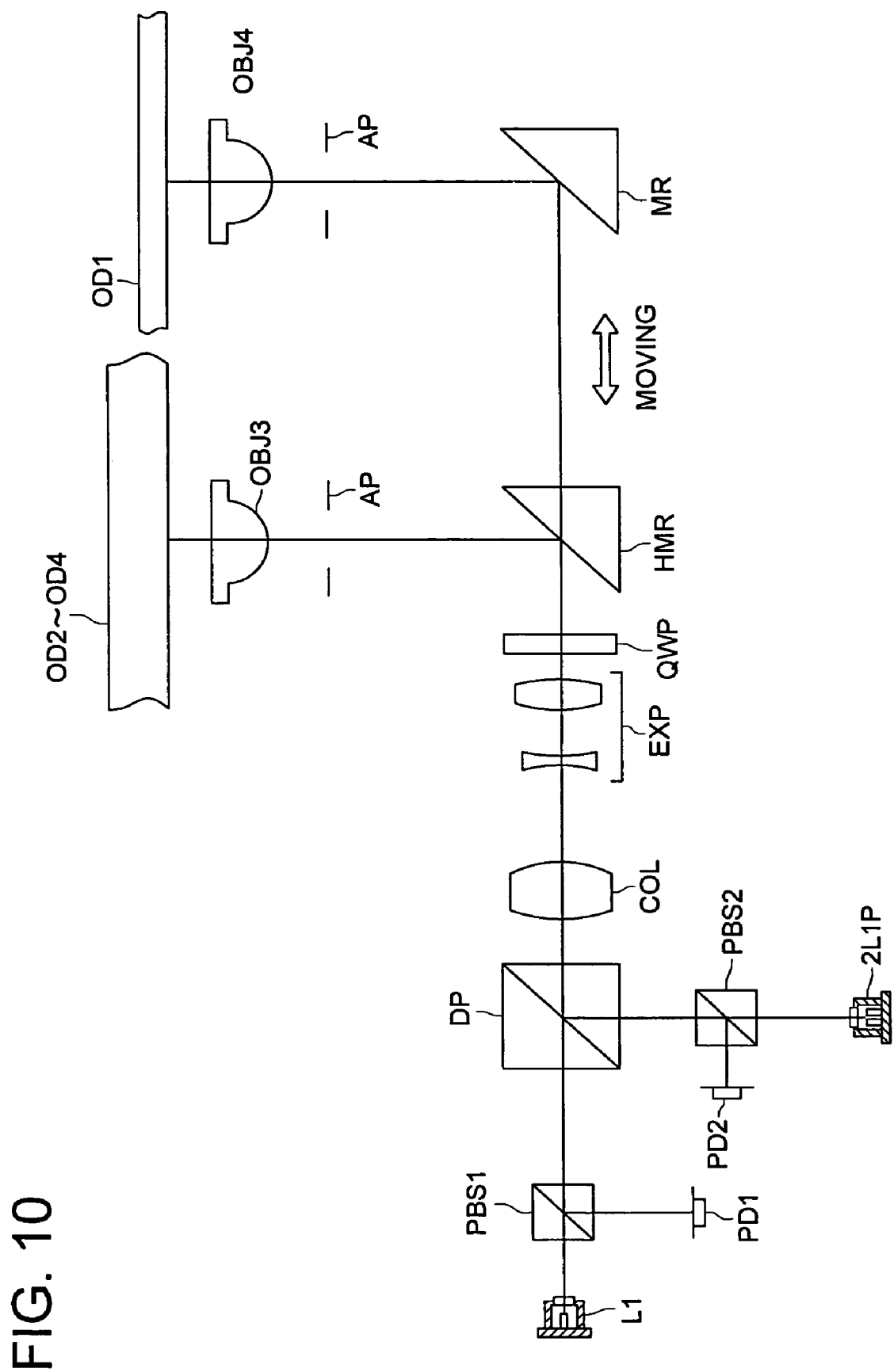

Each of FIGS. 2(a) and 2(b) shows an example of a diffractive structure;

Each of FIGS. 3(a) to 3(d) shows an example of a diffractive structure;

Each of FIGS. 4(a) and 4(b) shows an example of phase difference giving structure;

FIG. 5 shows a schematic of optical pickup apparatus PU1 of the first embodiment of the present invention;

FIG. 6 shows a bird's eye view of an objective lens actuator apparatus of the embodiment of the present invention;

FIG. 7 shows a schematic of structure of optical pickup apparatus PU2 of the second embodiment of the present invention;

FIG. 8(a) shows a front view of an objective lens,

FIG. 8(b) shows a side view of the objective lens and FIG. 8(c) shows a rear view of the objective lens;

FIG. 9 shows a configuration for guiding a light flux to objective lens by separating an optical path by a half mirror; and FIG. 10 shows a configuration to guide a light flux to objective lens by moving mirror.

DETAILED DESCRIPTION OF THE INVENTION

Preferred embodiments according to the present invention are described below.

Item 1 is an optical pickup apparatus for conducting at least recording or reproducing of information on two types of optical information recording media having protective substrates with different thicknesses. The optical pickup apparatus includes: a first light source for emitting a first light flux with a wavelength $\lambda 1$; a first objective lens; and a second objective lens. The first objective lens is used for converging the first light flux from the first light source on an information recording surface of a first optical information recording medium having a protective substrate with a thickness t1 when the optical pickup apparatus reproduces or records information for the first optical information medium. The second objective lens is used for converging the first light flux from the first light source on an information recording surface of a second optical information recording medium having a protective substrate with a thickness t2 (t2≠t1) when the optical pickup apparatus reproduces or records information for the second optical information medium. Herein, an effective diameter of the first objective lens and an effective diameter of the second objective lens are substantially same.

It is preferable that the above described optical pickup apparatus satisfies the following expression, $$0.8 \leq (f1 \times NA1)/(f2 \times NA2) \leq 1.2 \quad (1)$$

where NA1 is a numerical aperture of the first objective lens when the optical pickup apparatus reproduces information on the first optical information recording medium, f1 is a focal length of the first objective lens when the optical pickup apparatus reproduces information on the first optical information recording medium, NA2 is a numerical aperture of the second objective lens when the optical pickup apparatus reproduces information on the first optical information recording medium, and f2 is a focal length of the second objective lens when the optical pickup apparatus reproduces information on the first optical information recording medium.

In case of conducting reproducing and/or recording of information for both of the first optical information recording medium and the second optical information recording medium each having a different protective substrate thickness, by using a single objective lens, if spherical aberration is corrected for an optical information recording medium on one side, spherical aberration is generated for an optical information recording medium on the other side because of a difference of the protective substrate thickness. For example, third order spherical aberration W40 for the optical information recording medium on the other side in the case of correcting spherical aberration for an optical information recording medium on one side, is expressed by $$W40 = (\Delta t(n_\lambda^2 - 1)/(8 n_\lambda^2)) \cdot NA^4 \quad (3)$$

In the aforesaid expression, $\Delta t$ represents a difference of substrate thickness between optical information recording media, $n_\lambda$ represents a refractive index of a optical information recording medium substrate in wavelength $\lambda$ and NA represents a numerical aperture of the objective lens. When a difference of protective substrate thickness between two types of optical information recording media is large as in the condition in expression (3), the spherical aberration grows greater, resulting in a problem. In contrast to this, spherical aberration caused by a difference of protective substrate thickness has been corrected, by using diffraction for the objective lens or by making a conjugate length to be variable.

In case of conducting reproducing and/or recording of information for both of the first optical information recording medium and the second optical information recording medium each having a different protective substrate thickness, by using a single objective lens, spherical aberration caused by a difference of protective substrate thickness has been corrected by using diffraction for the objective lens or by making a conjugate length to be variable. First, in case that light fluxes each having the same wavelength are made to pass through the same diffractive structure when recording and/or reproducing information for the first optical information recording medium and for the second optical information-recording medium, diffraction efficiencies cannot be greater simultaneously for both media used. Thereby, either one of both efficiencies is made greater. For example, when efficiencies are balanced for two diffraction order numbers, a problem of insufficient quantity of light is caused because it is not possible to enhance respective efficiencies, which is not desirable. Second, in case of coping with respective optical information recording media by making a conjugate length of an objective lens and thereby, by correcting spherical aberration caused by a difference of protective substrate thickness, when a difference of protective substrate thickness between two types optical information recording media is great as in conditions in expression (3), a conjugate length of the objective lens necessary for securing a working distance (hereinafter referred to as WD) for conducting recording and/or reproducing of information for the optical information recording medium having a thicker protective substrate thickness becomes smaller. For example, correction of coma generated for lens shift caused by tracking of the objective lens, becomes difficult, which is not desirable. In the present invention, therefore, an objective lens exclusive for the first optical information recording medium and an objective lens exclusive for the second optical information recording medium are made to be separate, to be capable of conducting recording and/or reproducing of information properly even for any optical information recording medium, by carrying out optimum design of an objective lens, even when a protective substrate thickness varies depending on respective optical information recording media.

A light flux emitted from a semiconductor laser used generally as a light source has a distribution of a light intensity representing the so-called Gaussian distribution (rim intensity) wherein when its cross section is viewed in the direction perpendicular to its optical axis, the light intensity is the highest in the vicinity of the optical axis, and the light intensity is lowered sharply as it recedes from the optical axis and draws closer to the periphery. In this case, when the numerical aperture of the first objective lens is different from that of the second objective lens, it is possible to cause a light flux entering an objective lens on one side to form an appropriate light-converged spot on an image recording surface of an optical information recording medium, by using a range in the vicinity of the center of a light flux emitted from a semiconductor laser. When using the same semiconductor laser, however, for the light flux entering an objective lens on the other side, a range distant from the optical axis also needs to be used, and an amount of light on the peripheral portion is lowered greatly. In this case, the so-called apodization effect enlarges a diameter of a spot converged on an information recording surface of an optical information recording medium, resulting in a fear that recording and/or reproducing of information cannot be conducted properly.

In embodiments according to the present invention, therefore, an effective diameter of the first objective lens is made to be substantially the same as that of the second objective lens, to cause the rim intensity to be the substantially same, so that an appropriate light-converged spot may be formed on each of information recording surfaces of the first optical information recording medium and the second optical information recording medium. Incidentally, under the assumption that D represents an effective diameter, f represents a focal length of an objective lens and NA represents a numerical aperture, the expression of $D=2\times f\times NA$ holds, and the numerical aperture NA is prescribed by specifications of the optical information recording medium. Therefore, "effective diameters are substantially same" means making $f1\times NA1 \approx f2 \times NA2$ to hold under the assumption that f1 represents a focal length of the first objective lens and NA1 represents its numerical aperture, and f2 represents a focal length of the second objective lens and NA2 represents its numerical aperture. It is therefore assumed that "effective diameters are substantially same" means satisfying the following expression.

$$0.8 \leq (f1 \times NA1)/(f2 \times NA2) \leq 1.2 \qquad (1)$$

Item 2 is the optical pickup apparatus described in Item 1, further including: a second light source for emitting a second light flux with a wavelength $\lambda 2$ ($\lambda 2 > \lambda 1$). One of the first objective lens and the second objective lens converges the second light flux from the second light source on an information recording surface of a third optical information recording medium having a protective substrate with a thickness t3 ($t3 \neq t1$) when the optical pickup apparatus reproduces or records information for the third optical information medium. Therefore, it allows compatibly recording and/or reproducing information for DVD additionally to BD and HD.

Item 3 is the optical pickup apparatus described in Item 2, further comprising: a third light source for emitting a third light flux with a wavelength $\lambda 3$ ($\lambda 3 > \lambda 2$). One of the first objective lens and the second objective lens converges the third light flux from the third light source on an information recording surface of a fourth optical information recording medium having a protective substrate with a thickness t4 ($t4 \neq t1$, $t4 \neq t2$) when the optical pickup apparatus reproduces or records for the fourth optical information medium. Therefore, it allows compatibly recording and/or reproducing information for DVD and CD additionally to BD and HD.

Item 4 is the optical pickup apparatus described in any one of Items 1-3, further including a switching element for switching an optical path of the first light flux from the first light source such that the first light flux enters into one of the first objective and the second objective lens corresponding to an optical information recording medium to be used. Therefore, it allows using the first light source for a plurality of optical information recording media in common.

Item 5 is the optical pickup apparatus described in Item 4, and the switching element includes an actuator for selectively inserting the first objective lens or the second objective lens in an optical path where a light flux from the first light source passes through.

Item 6 is the optical pickup apparatus described in any one of Items 1-5, satisfying the following expression.

$$2.5 < t2/t1 \qquad (2)$$

Where t1 is a thickness of the protective substrate of the first optical information recording medium, and t2 is a thickness of the protective substrate of the second optical information recording medium.

Item 7 is the optical pickup apparatus described in any one of Items 1-6, further comprising a collimate lens arranged in an optical path from the first light source to the first objective lens or the first light source to the second objective lens. The collimate lens is commonly used for recording or reproducing information for the first optical information recording medium and used for recording or reproducing information for the second optical information recording medium.

Item 8 is the optical pickup apparatus described in any one of Items 1-7 in which the first optical information recording medium is an optical disk for BLU-RAY DISC, and the second optical information recording medium is an optical disk for HD DVD.

It is preferable that when recording and/or reproducing information onto/from three kinds of optical information recording medium or four kinds of optical information recording medium, at least one of the two objective lens is arranged to record/reproduce information onto/from two kinds of optical information recording media or three kinds of optical information recording media. It is also preferable that the objective lens has a phase structure thereon to have compatibility over the optical information recording medium.

The phase structure formed on an optical surface of the objective lens is a structure to correct chromatic aberration caused by the difference between the first wavelength $\lambda 1$ and the second wavelength λ2 and/or the spherical aberration caused by the difference of the protective substrates of the first optical information recording medium and the second optical information recording medium. The chromatic aberration described above is a difference of paraxial image point locations and/or spherical aberration caused by the difference of wavelengths.

Figure 1A:
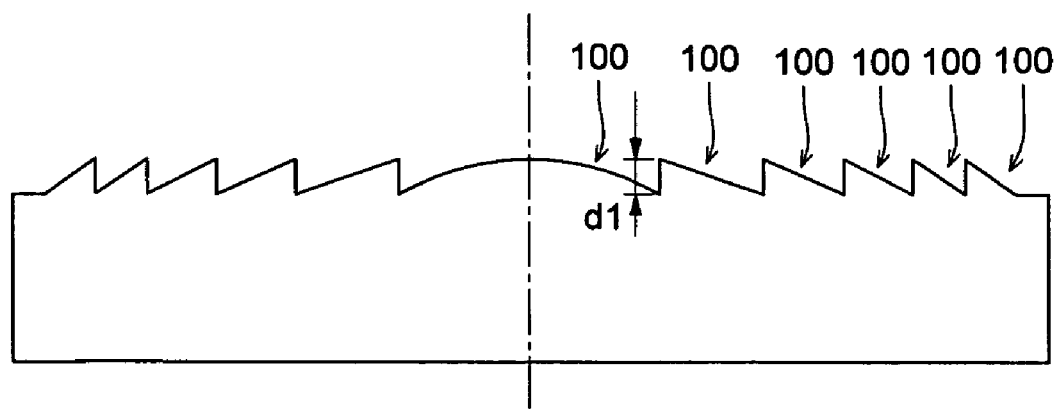
Figure 1B:
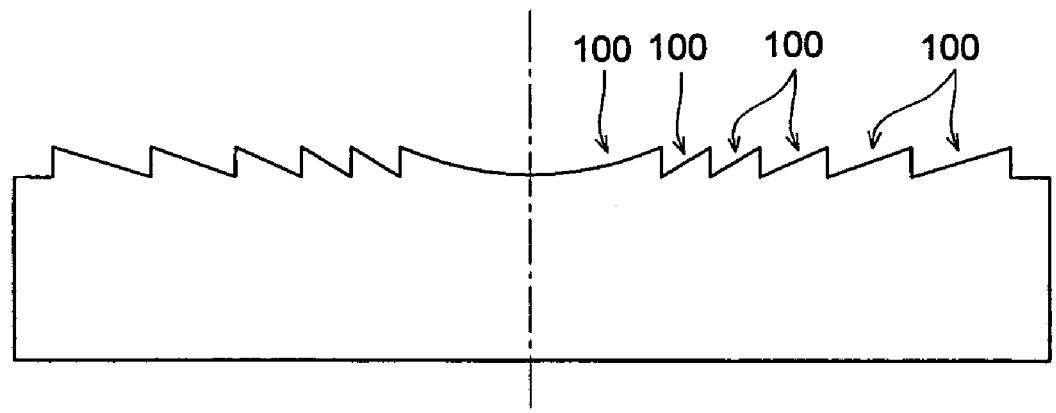
Figure 3A:
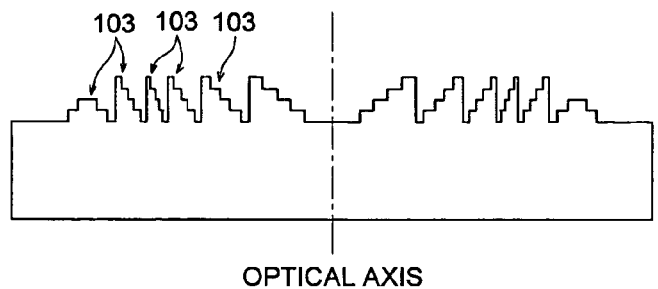
Figure 3B:
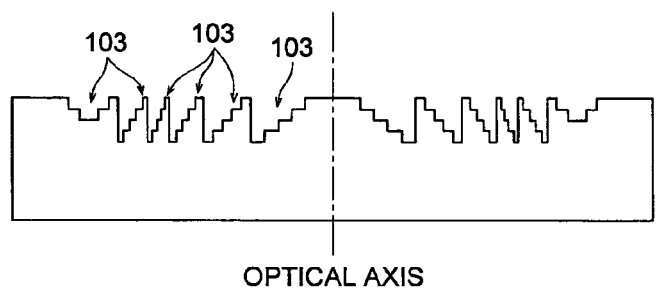
Figure 3C:
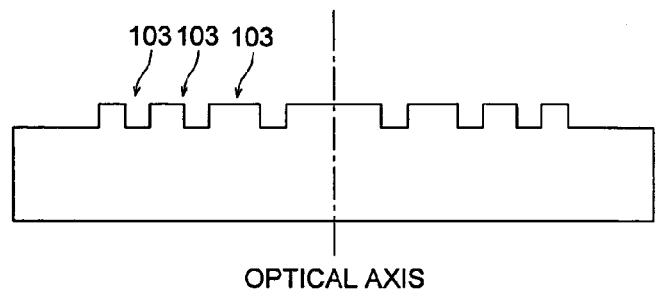
Figure 3D:
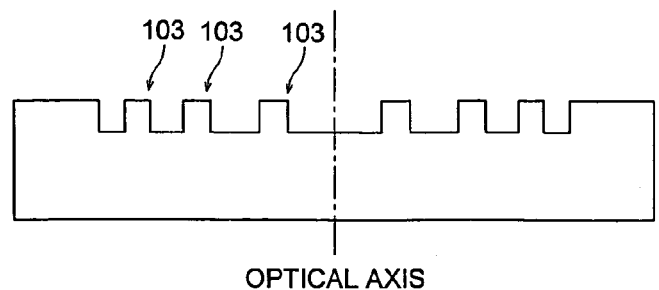
Figure 4:
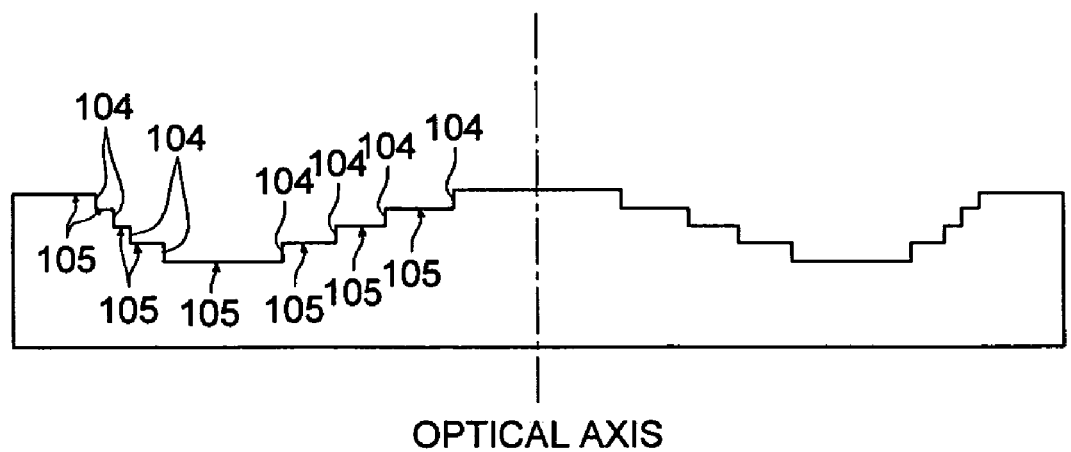
Figure 4:
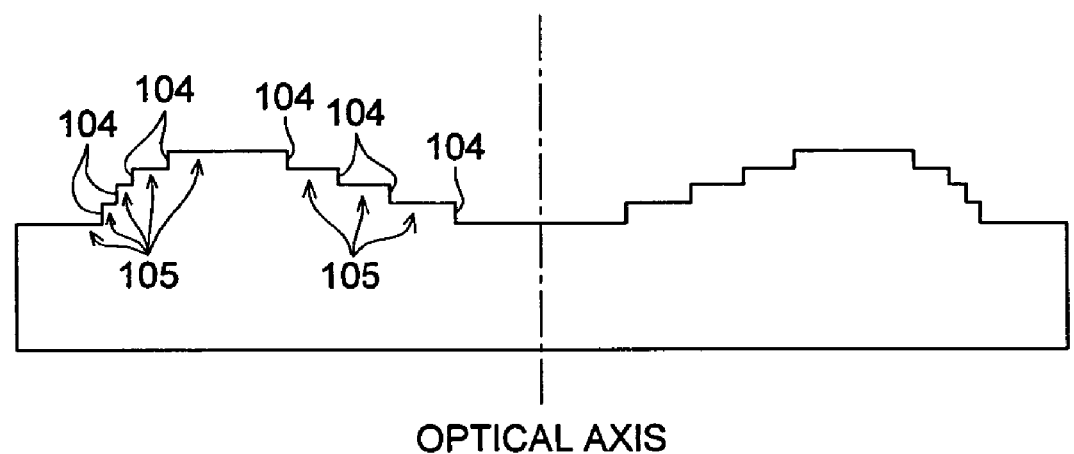

The phase structure described above may be a diffractive structure or an optical path giving structure. As the diffractive structure, there are several kinds of structure are available as shown in FIGS. 1(a), 1(b), 2(a), 2(b), 3(a), 3(b), 4(a), and 4(b) described below. Each of FIGS. 1(a) and 1(b) schematically shows a structure having plural ring zones 100 having a cross section including the optical axis being shaped in a saw tooth. Each of FIGS. 2(a) and 2(b) schematically shows a structure having stepping structure 101 including plural zone 102 in an effective aperture having a cross section including an optical axis being shaped in a step shape. Each of FIGS. 3(a) and 3(b) schematically shows a structure having plural zone 103 including a stepping structure therein. Each of FIGS. 4(a) and 4(b) schematically shows a structure having plural zone 105 including stepping structure 104 in an effective aperture, in which the direction of stepping structure 104 is changed. With regard to the optical path giving structure, as schematically shown in FIGS. 4(a) and 4(b), there is a structure having plural zone 105 including stepping structure 104 in an effective aperture, in which the direction of stepping structure 104 is changed. Consequently, the structures shown in FIGS. 4(a) and 4(b), may be a diffractive structure or an optical path providing structure. Each of FIGS. 1(a)-4(b) schematically shows example in which each phase structure is formed on a plane surface. However each phase structure may be formed on an aspherical surface.

Further, the objective lens above may be a plastic lens or a glass lens. In the case of the objective lens being a plastic lens, it is preferable that a plastic material of cyclic olefin is used. It is preferable that among the cyclic olefin, there is used a plastic material having a refractive index $N_{405}$ being within a range of 1.54 to 1.60 at a temperature of 25° C., and a rate of change of the refractive index $dN_{405}/dT$ (° $C.^{-1}$) of a wavelength 405 nm being within a range of $-10 \times 10^{-5}$ to $-8 \times 10^{-5}$ in temperature range from −50° C. to 70° C.

When the objective lens is a glass lens, the life of die can be prolonged by using glass material having a glass transition temperature Tg of 400° C., since the glass material is deformed at relatively low temperature. As a glass material having low transition temperature, for example, there are K-PG325 and K-PG 375, both are product names of Sumita Optical Glass, Inc.

Since the specific gravity of glass is in general larger than that of a plastic lens, if the objective lens is a glass lens, the weight of the objective optical lens becomes heavy and the workload on an actuator to drive the objective optical system becomes heavy. Accordingly, it is preferable that when the objective lens is a glass lens, low specific gravity glass is used. It is preferable that the specific gravity of the glass material is not more than 3.0, preferably not more than 2.8.

As the material of the objective lens, material in which particles having a diameter of not more than 30 nm are dispersed may be used. The temperature dependency of refractive index can be cancelled by mixing the inorganic material having a characteristic that the refractive index goes up when temperature goes up into plastic material having characteristic that the refractive index goes down when temperature goes up. Consequently, optical material (it will be called athermal plastic hereinafter) having a low rate of change for a refractive index against temperature change can be obtained while maintaining the moldablility of plastic material.

A temperature characteristic of an objective lens will be explained. The rate of change of refractive index against temperature change A will be expressed by a following formula based on the formula of Lorentz-Lorenz by deriving refractive index n by temperature T.

$$A = \frac{(n^2 + 2)(n^2 - 1)}{6n \times \left[(-3\alpha) + \frac{1}{[R]} \times \frac{\partial [R]}{\partial T}\right]}$$

Where n denotes a refractive index of the objective lens against a wavelength of a laser light source; α denotes a line expansion coefficient; and [R] denotes a molecular refractive power.

In the case of general plastic material, contribution of the second term is small, since comparing with the first term, the second term may be ignored. For example, in the case of acrylic resin (PMMA), line expansion coefficient α is $7 \times 10^{-5}$. By substituting this to the formula shown above, $A=12 \times 10^{-5}$, which is generally equal to a measurement result. In the case of athermal resin, dispersing it into plastic material of particle having a diameter of not more than 30 nm allows the contribution of the second term in the formula shown above to become large to cancel the effect of the change of the line expansion coefficient of the first term. It is preferable to suppress the rate of change of refractive index against temperature which has been around $-12 \times 10^{-5}$ to $10 \times 10^{-5}$ in an absolute value, preferably $8 \times 10^{-5}$ and further preferably $6 \times 10^{-5}$ from the viewpoint of reducing the spherical aberration change based on temperature change of the objective lens.

For example, it is possible to eliminate the dependency of a refractive change against a temperature change by dispersing fine niobium oxide particles ($Nb_2O_5$) in acrylic resin (PMMA). Plastic material as ground material 80 and niobium oxide 20 in volume ratio are uniformly mixed. There is a problem that fine particles tend to coagulate. However, technology to disperse particles by giving electrons onto the surface of the particles is known. Accordingly, it becomes possible to cause a necessary dispersion state.

This volume ratio can be adjusted to control the rate of the refractive change against temperature change. Also it is possible to blend and disperse plural kinds of nanometer-sized inorganic.

In the example described above, ground material 80 and niobium oxide 20 in volume ratio are uniformly mixed. The vole ratio can be adjusted between 90:10 and 60:40. If volume ratio is smaller than 90:10, then the effect to suppress the refractive change becomes small and if the volume ratio is over 60:40, then the formability of athermal resin becomes problematic.

It is preferable that the fine particle is inorganic material, and oxide material, which cannot be further oxidized is more preferable. Since inorganic material suppresses reaction against plastic material being polymer organic compound, and oxide prevents the transmission efficiency degradation and wavefront aberration caused by long time irradiation of blue-violet laser. Particularly, a severe condition that blue-violet laser irradiates a beam-condensing element for a long time, oxidation tends to be proceeded. However if the objective lens is formed by inorganic material, the transmission efficiency degradation and the wavefront aberration can be prevented.

When the diameter of fine particle, which is dispersed into plastic material is large, incident light beams tend to be dispersed and the transmission efficiency of a beam-condensing element goes down. In a high density optical disc, when the transmission efficiency of a beam-condensing element for blue-violet laser is low, it will be a disadvantage from the viewpoint of high speed recording and capability of recording and/or reproducing information onto/from a multi-layer optical disc, taking account that output power of blue-violet laser used for recording and/or reproducing information is not high enough. Consequently, it is preferable that the diameter of fine particle dispersed into plastic material is not more than 20 nm, further preferably not more than 10-15 nm from the view point of prevention of transmission efficiency of the objective lens.

While the preferred embodiments of the present invention have been described using specific terms, such description is for illustrative purposes only, and it is to be understood that changes and variations may be made without departing from the spirit or scope of the appended claims.

The First Embodiment

The present invention will be described in detail by referring drawings below. The recording densities ($\rho 1$-$\rho 4$) of the first disc to fourth disc are $\rho 4 < \rho 3 < \rho 2 < \rho 1$. The magnification factor of objective optical system OBJ1 or OBJ2, when recording and/or reproducing information onto/from the first optical disc to the fourth optical disc, are the first magnification factor M1 to the fourth magnification factor M4, respectively. However, the combination of a wavelength, a thickness of a protective substrate, a numerical aperture, a recording density and a magnification factor is not limited to this embodiment.

FIG. 5 shows a sectional schematic drawing of an optical pickup of the first embodiment of the present invention capable of recording and/or reproducing information onto/from a high density optical disc (the first disc or the second disc), a conventional DVD (the third disc) and a CD (the fourth disc).

FIG. 6 shows a bird's view of an objective lens actuator apparatus used for the optical pickup apparatus of the embodiment of the invention. The objective lens actuator apparatus (the actuator) will be described. Objective lens actuator apparatus 10 shown in FIG. 6 is provided in the optical pickup apparatus shown in FIG. 5. The objective lens actuator apparatus 10 comprises OBJ1 (the first objective lens); and OBJ2 (the second objective lens) which converge light flux from a semiconductor laser onto different information recording surfaces of different optical discs, respectively. The objective lens actuator apparatus 10 also comprises lens holder 13 for holding objective lenses OBJ1 and OBJ2 on the same circumference 13A; chassis 15 for supporting lens holder 13 so that lens holder 13 can freely-rotate around supporting shaft 14 provided the center of circumference 13A and reciprocally moving along the center axis of the rotation; a focusing actuator (not shown) to reciprocally move lens holder 13 along supporting axis 14; and tracking actuator 20 to give lens holder 13 rotating power to rotate each objective lens OBJ1 and OBJ2 for fixing a position. Objective lens actuator apparatus 10 includes an operation control circuit (not shown) for controlling each actuator.

Objective lens OBJ1 and OBJ2 are provided in a hole formed in lens holder 13 structured in a circular plate, the hole is formed through lens holder 13. Objective lens OBJ1 and OBJ2 are provided in the same distance from the center of lens holder 13. Lens holder 13 is connected to the top end of supporting shaft 14, which is provided on chassis 15 in the center of lens holder 13 so that lens holder 13 can freely rotates. A focusing actuator (not shown) is provided under supporting shaft 14.

Namely, this focusing actuator comprises an electric magnet solenoid having a permanent magnet provided in a lower end of supporting shaft 14 and a coil provided around the permanent magnet therein. The focusing actuator is designed to adjust a focus distance with a fine pitch by adjusting electric current in the coil to reciprocally moving the supporting shaft 14 and lens holder 13 along the supporting shaft 14 (up and down direction in FIG. 6).

As described above, lens holder 13 is designed to freely swing based on the force of tracking actuator on the center of supporting shaft 14 having an axis parallel to an optical axis. Tracking actuator comprises a pare of tracking coil 21A and 21B provided in the edge of lens holder 13, each of which is positioned in a symmetry across supporting shaft 14, two pares of magnets 22A, 22B, 23A and 23B provide adjacent the edge of lens holder 13, each of which is positioned in a symmetry across supporting shaft 14 on chassis 15.

Positions of magnet 22A and 22B is arranged so that when tracking coils 21A and 21B opposes to a paired magnets 22A and 22B, objective lens OBJ1 is positioned on the optical path of the light flux reflected by reflection mirror 16. Positions of magnet 23A and 23B is arranged so that when tracking coils 21A and 21B opposes to a pared magnets 23A and 23B, objective lens OBJ2 is positioned on the optical path of the light flux reflected by reflection mirror 16.

A stopper (not shown) to limit a swinging range is provided in the lens holder 13 so that tracking coils 21A and 21B do not oppose to magnets 22B or 23B, and magnets 22A or 23A respectively.

Tracking actuator 20 is arranged so that the tangent line direction of outer circumference of lens holder 13 formed in circular shape crosses with the tangential line direction of a track of the optical disc in a right angle. Tracking actuator corrects a deviation of an irradiating position of a light flux to the track by forcing lens holder 13 to swing with a fine pitch. Accordingly, it is necessary that tracking coils 21A and 21B swing lens holder 13 with a fine pitch while tracking coils 21A and 21B respectively oppose to magnets 22A and 22B.

In order to perform tracking operation, respective tracking coils 21A and 21B have a piece of iron therein. An operation control circuit is designed to control electric current in each tracking coil 21A and 21B so that tacking coils 21A and 21B generate repulsive force against the each magnet while the each magnet pulls the piece of iron.

An optical pickup apparatus of the invention will be described blow. When recording and/or reproducing information onto/from information surfaces of four kinds of optical discs OD1-OD4, lens holder 13 of objective lens actuator 10 is rotated to move objective optical lenses OBJ1 or OBJ2 in a optical path as shown in FIG. 5. In the embodiments of the invention, the first semiconductor laser LD1 and the second semiconductor laser LD2 are placed on the same printed circuit board, which configures a single unit called two laser diodes in one package. Herein, effective diameters of the objective lens OBJ1 and the Objective lens OBJ2 are substantially same.

[When Recording and/or Reproducing Information onto/from the First Optical Disc OD1]

At first, objective lens OBJ1 is inserted in an optical path by rotating lens holder 13 in objective lens actuator 10. A beam shape of a light flux emitted from the first semiconductor laser LD1 (wavelength $\lambda 1=400$ nm to 420 nm) is corrected by beam shaper BS. The light flux is shaped in parallel light flux by collimator lens COL after passing through dichroic prism DP and then pass through polarization beam splitter PBS. Where polarization beam splitter means an element having a property so as to emit a light flux having a first polarizing component in one direction and emit a light flux having a second polarizing component in the other direction. And the light flux is guided to beam expander EXP having optical elements L1 and L2. Beam expander EXP in which at least one of optical elements L1 or L2 (preferably L1 in this embodiment) is arranged to move in an optical axis direction, corrects or expands the parallel light flux to correct chromatic aberration and spherical aberration. Particularly, a diffractive structure (diffractive ring-shaped zones) is provided on the surface of the other optical element L2 to correct chromatic aberration of the light flux emitted from the first semiconductor laser D1. The diffractive structure for correcting chromatic aberration may be provided not only in optical element L2 but also in other optical elements, for example, collimator lens COL, etc. A chromatic aberration correcting function can be achieved not only by the diffractive structure but also by a phase structure and/or multi-level structure, etc.

As described above, the chromatic aberration and the spherical aberration can be corrected by providing beam expander EXP. Further, when a high density DVD has two information recording surfaces therein, selection of the information recording surface can be conducted by moving optical element L1 in an optical axis direction. A chromatic aberration correction optical element and a spherical aberration correction optical element can be provided not only in beam expander EXP but also in objective lens OBJ1 having a structure such as diffractive structure.

In FIG. 5, a light flux passed through beam expander EXP passes through quarter wave plate QWP and diaphragm AP guided to objective lens OBJ1 which is formed by merely a refraction surface. The objective lens OBJ1 converges the light flux into a converged spot on an information recording surface of the first optical disc OD1 through a protective substrate (thickness $t1=0.085$ mm to 0.1 mm).

The light flux reflected by an information pit on an information recording surface again pass through objective lens OBJ1, diaphragm AP, quarter wave plate QWP and beam expander EXP. Then the light flux is reflected by polarized beam splitter PBS and cylindrical lens CY1 gives astigmatism to the light flux. Then the light flux reaches to photodetector PD after passing through sensor lens SL1. Information recorded on the first optical disc OD1 is obtained by using the output of photodetector PD.

Focal point detection and track detection are performed by detecting the change of light amount based on the change of a light spot shape and the change of a light spot location. Based on these detections, a focusing actuator (not shown) and tracking actuator 20 of objective lens actuator mechanism 10 moves objective lens OBJ1 as one body with objective lens OBJ2 so that light flux from the first semiconductor laser LD1 is converged on the information recording surface of the first optical disc OD1.

[When Recording and/or Reproducing Information onto/from the Second Optical Disc OD2]

Next, objective lens OBJ2 is inserted in an optical path by rotating lens holder 13 in objective lens actuator 10. A beam shape of a light flux emitted from the first semiconductor laser LD1 (wavelength $\lambda 1=400$ nm to 420 nm) is corrected by beam shaper BS. The light flux is shaped in parallel light flux by collimator lens COL after passing through dichroic prism DP and then pass through polarization beam splitter PBS. And the light flux is guided to beam expander EXP having optical elements L1 and L2.

The light flux passed through beam expander EXP pass through quarter wave plate QWP and diaphragm AP guided to objective lens OBJ2. The objective lens OBJ2 converges the light flux into a converged spot on an information recording surface of the second optical disc OD2 through a protective substrate (thickness $t2=0.55$ mm to 0.65 mm).

The light flux reflected by an information pit on an information recording surface again pass through objective lens OBJ2, diaphragm AP, quarter wave plate QWP and beam expander EXP. Then the light flux is reflected by polarized beam splitter PBS and cylindrical lens CY1 gives astigmatism to the light flux. Then the light flux reaches to photodetector PD after passing through sensor lens SL1. Information recorded on the second optical disc OD2 is obtained by using the output of photodetector PD.

Focal point detection and track detection are performed by detecting the change of light amount based on the change of a light spot shape and the change of a light spot location. Based on these detections, a focusing actuator (not shown) and tracking actuator 20 of objective lens actuator mechanism 10 moves objective lens OBJ2 as one body with objective lens OBJ1 so that light flux from the first semiconductor laser LD1 is converged on the information recording surface of the second optical disc OD2.

[When Recording and/or Reproducing Information onto/from the Third Optical Disc OD3]

In FIG. 5, the beam shape of a light flux emitted from the second semiconductor laser LD2 as the second light source (wavelength $\lambda 2=640$ nm to 670 nm) is corrected by beam splitter BS. The light flux passes through dichroic prism DP and are shaped into parallel light flux by collimator lens. Then the light flux passes through polarized beam splitter PBS and enters into beam expander EXP having optical elements L1 and L2.

In FIG. 5, the light flux passed through beam expander EXP passes through quarter wave plate QWP and diaphragm AP guided to objective lens OBJ1 or OBJ2 which is formed by merely a refraction surface. The light flux passing through objective lens OBJ1 or OBJ2 is converged into a focal spot on an information recording surface of the third optical disc OD3 through a protective substrate (thickness $t3=0.55$ mm to 0.65 mm).

The light flux reflected by an information pit on an information recording surface again passes through objective lens OBJ1 or OBJ2, diaphragm AP, quarter wave plate QWP and beam expander EXP. Then the light flux is reflected by polarized beam splitter PBS and cylindrical lens CY1 gives astigmatism to the laser beams. Then the light flux reaches to photodetector PD after passing through sensor lens SL1. Information recorded on the third optical disc OD3 is obtained by using the output of photodetector PD.

Focal point detection and track detection are performed by detecting the change of light amount based on the change of a light spot shape and the change of a light spot location. Based on this detection, a focusing actuator (not shown) and tracking actuator 20 of objective lens actuator mechanism 10 moves objective lens OBJ1 or objective lens OBJ2 so that light flux from the second laser diode LD2 is converged on the information recording surface of the third optical disc OD3.

[When Recording and/or Reproducing Information onto/from the Fourth Optical Disc OD4]

The beam shape of the light flux emitted from the third semiconductor laser LD3 as the third light source (wavelength $\lambda 3$=750 nm-820 nm) is corrected by beam splitter BS. The light flux passes through dichroic prism DP and are shaped into a parallel light flux by collimator lens. Then the light flux passes through polarized beam splitter PBS and enters into beam expander EXP having optical elements L1 and L2.

The light flux passed through beam expander EXP passes through quarter wave plate QWP and diaphragm AP guided to objective lens OBJ1 or OBJ2 which is formed by merely a refraction surface. The light flux pass through objective lens OBJ1 or OBJ2 is converged into a converged spot on an information recording surface of the fourth optical disc OD4 through a protective substrate (thickness t4=1.2 mm).

The light flux reflected by an information pit on an information recording surface again pass through objective lens OBJ1 or OBJ2, diaphragm AP, quarter wave plate QWP and beam expander EXP. Then the light flux is reflected by polarized beam splitter PBS and cylindrical lens CY1 gives astigmatism to the light flux. Then the light flux reaches to photodetector PD after passing through sensor lens SL1. Information recorded on the forth optical disc OD4 is obtained by using the output of photodetector PD.

Focal point detection and track detection are performed by detecting the change of light amount based on the change of a light spot shape and the change of a light spot location. Based on this detection, a focusing actuator (not shown) and tracking actuator 20 of objective lens actuator mechanism 10 moves objective lens OBJ1 or objective lens OBJ2 so that light flux from the third semiconductor laser LD3 are converged on the information recording surface of the fourth optical disc OD4.

Second Embodiment

FIG. 7 shows a schematic diagram of an optical pickup apparatus of a second embodiment of the present invention. In this embodiment, the first, second and third semiconductor lasers are attached on the same board, which is a single unit called three laser diodes in one package 3LIP.

A beam shape of light flux emitted from the first semiconductor laser LD1, the second semiconductor laser LD2 and the third semiconductor laser LD3 is corrected by beam shaper BS. Each of the light fluxes is shaped in parallel light flux by collimator lens COL and then passes through polarization beam splitter PBS. And the light flux is guided to beam expander EXP having optical elements L1 and L2.

the light flux passed through beam expander EXP passes through quarter wave plate QWP and diaphragm AP guided to objective lenses OBJ1 or OBJ2 which is formed by merely a refraction surface. The light flux passes through objective lens OBJ1 or OBJ2 is converged into a converged spot on an information recording surface of any one of the first-fourth optical discs OD1-OD4 through the protective substrate.

The light flux reflected by an information pit on an information recording surface again passes through objective lens OBJ1 or OBJ2, diaphragm AP, quarter wave plate QWP and beam expander EXP. Then the light flux is reflected by polarized beam splitter PBS and cylindrical lens CY1 gives astigmatism to the laser beams. Then the light flux reaches to photodetector PD after passing through sensor lens SL1. Information recorded on any one of the first, second, or fourth optical disc OD1, OD2, OD3 or OD4 is obtained by using the output of photodetector PD.

Focal point detection and track detection are performed by detecting the change of light amount based on the change of a light spot shape and the change of a light spot location. Based on this detection, a focusing actuator (not shown) and tracking actuator 20 of objective lens actuator mechanism 10 moves objective lens OBJ1 or objective optical lens OBJ2 so that laser beams from the third semiconductor laser LD3 are converged on the information recording surface of any one of the first, second, or fourth optical disc OD1, OD2, OD3 or OD4.

In the embodiments described above, either of objective optical lenses is mechanically placed in an optical path by moving lens holder 13 on which two objective lenses BJ1 and OBJ2 are fixed. However the present invention is not limited to this embodiment. For example, following variations are available. The first variation has a moving mirror or a movable prism to change an optical path to either of the objective lenses corresponding to the optical disc to be used while objective lens OBJ1 and OBJ2 are fixed. "Fixed" in the above sentence means that Objective lenses OBJ1 and OBJ2 move in the optical axis direction for focusing, however they do not move in the direction being vertical to the optical axis. Another variation is that a polarized beam splitter, etc. having a polarizing effect is used to change an optical path without using a moving portion. Another variation is that two independent optical systems having an optical path from three light sources to the two objective lenses are provided. Further, it is not necessary that objective lenses OBJ1 and OBJ2 are respective different bodies. For example, when the objective element is formed by plastic resin, objective elements OBJ1 and OBJ2 are formed in a body in a parallel arrangement.

Third Embodiment

FIGS. 9 and 10 show pickup apparatus configurations in which the positions of objective lens described above are fixedly deployed. FIG. 9 shows a configuration for recording and or reproducing information onto or from each disc by separating an optical path using half mirror HMR as a beam splitter and guiding optical beams into first objective lens OBJ3 and second objective lens OBJ4 which are fixedly deployed so that each optical axis is arranged to be parallel each other.

In FIG. 9, there are provided semiconductor laser L1 as a first light source for BD or HD, semiconductor laser L2 as a second light source for DVD and semiconductor laser L3 as a third light source for CD, which are packaged into one package 2L1P in this embodiment. In this embodiment, the effective diameter of the first objective lens OBJ3 and the effective diameter of the second objective lens OBJ4 are substantially same.

[When Recording and or Reproducing Information onto or from the First Optical Disc OD1]

A light flux emitted from the first semiconductor laser LD1 (wavelength $\lambda 1$=400 nm-420 nm) are shaped in parallel laser beams by collimator lens COL after passing through dichroic prism DP as a wavelength selection element, then entering into beam expander EXP structured by plural optical elements.

The light flux passed through beam expander EXP transmit through quarter wave plate QWP (and aperture AP). A part of the light flux reflected by half mirror HMR and the other pass through half mirror HMR.

Half mirror HMR is arranged to separate almost all incident light flux having wavelength of λ1 into transmitted light flux and reflected light flux, and to transmit or reflect almost all the incident light flux having wavelength λ2 and λ3. (The configuration shown in FIG. 9 is an example of reflection.)

When recording and or reproducing information onto or from the first optical disc OD1, half mirror reflects a part of light flux transmitted through the half mirror to change the direction of the light flux for guiding the light flux into second optical objective element OBJ4. The light flux is focused onto the recording surface of the first optical disc OD1 through the protective substrate (thickness t1=0.085 mm-0.1 mm).

The reflected light flux modulated and reflected by information pits on the information recording surface is guided into photodetector PD1 after passing back through second objective lens OBJ4, half mirror HMR, quarter wave plate QWP and beam expander EXP, and reflected by polarized beam splitter PBS1. Since the light flux enters into photodetector PD1, information signal which is recorded onto the first optical disc OD1 is obtained by using the output signal of photodetector PD1.

Focal point detection and tacking detection are performed by detecting a light amount change caused by a shape change and position change of the spot formed on the photodetector PD. Based on this detection described above, a focusing actuator and a tracking actuator (not shown) of an objective lens actuator mechanism moves second objective lens OBJ4 so that the light flux emitted from the first semiconductor laser LD1 is focused onto the information recording surface of the first optical disc OD1 and the second optical disc OD2.

[When Recording and or Reproducing Information onto or from the Second Optical Disc OD2]

A light flux emitted from the first semiconductor laser LD1 (wavelength λ1=400 nm to 420 nm) is shaped in parallel light flux by collimator lens COL after passing through dichroic prism DP as a wavelength selection element, then entering into beam expander EXP structured by plural optical elements.

The light flux passed through beam expander EXP transmit through quarter wave plate QWP. A part of the light flux reflected by half mirror HMR and the other pass through half mirror HMR.

When recording and or reproducing information onto or from the second optical disc OD2, half mirror reflects a part of light flux transmitted through the half mirror to change the direction of the light flux for guiding the light flux into first objective lens OBJ3. The light flux is formed into a converged light spot onto the recording surface of the second optical disc OD2 through the protective substrate (thickness t2=0.55 mm to 0.65 mm).

The reflected light flux modulated and reflected by information pits on the information recording surface is guided into photodetector PD1 after passing back through first objective lens OBJ3, half mirror HMR, quarter wave plate QWP and beam expander EXP, and reflected by polarized beam splitter PBS1. Since the light flux enters into photodetector PD1, information signal which is recorded onto the first optical disc OD1 is obtained by using the output signal of photodetector PD1.

Focal point detection and tacking detection are performed by detecting a light amount change caused by a shape change and position change of the spot formed on the photodetector PD. Based on this detection described above, a focusing actuator and a tracking actuator (not shown) of an objective lens actuator mechanism moves first objective lens OBJ3 so that the light beams emitted from the first semiconductor laser LD1 is focused onto the information recording surface of the second optical disc OD2.

[When Recording and or Reproducing Information on the Third Optical Disc OD3]

A light flux emitted from the second semiconductor laser LD2 (wavelength λ2=640 nm-670 nm) is shaped in parallel light flux by collimator lens COL after passing through polarized beam splitter PBS2 and reflected by dichroic prism DP as a wavelength selection element, then entering into beam expander EXP.

The light flux transmitted through beam expander EXP passes through quarter wave plate QWP. Half mirror HMR reflects almost part of the light flux, which is guided into first objective lens OBJ3. Then the light flux is focused onto the information recording surface of third optical disc OD3 after passing through the protective substrate (thickness t3=0.55 mm-0.65 mm).

The light flux modulated and reflected by information pits on the information recording surface is guided into photodetector PD2 after passing back through first objective lens OBJ3, half mirror HMR, quarter wave plate QWP, beam expander EXP and collimator COL, then reflected by dichroic prism DP and polarized beam splitter PBS2. Information signal, which is recorded onto the third optical disc OD3 is obtained by using the output signal of photodetector PD2.

Focal point detection and tacking detection are performed by detecting a light amount change caused by a shape change and position change of the spot formed on the photodetector. Based on this detection described above, a focusing actuator and a tracking actuator (not shown) of an objective lens actuator mechanism moves first objective lenses OBJ3 so that the light flux emitted from the second semiconductor laser LD2 is focused onto the information recording surface of the third optical disc OD3.

[When Recording and or Reproducing Information onto or form the Fourth Optical Disc OD4]

A light flux emitted from the third semiconductor laser LD3 (wavelength λ3=750 nm-820 nm) is shaped in parallel light flux by collimator lens COL after passing through polarized beam splitter PBS2 and reflected by dichroic prism DP as a wavelength selection element, then entering into beam expander EXP.

The light flux transmitted through beam expander EXP passes through quarter wave plate QWP. Half mirror HMR reflects almost part of the light flux, which is guided into first objective lens OBJ3. Then the light flux is focused onto the information recording surface of fourth optical disc OD4 through the protective substrate (thickness t4=1.2 mm).

The reflected light flux modulated and reflected by information pits on the information recording surface is guided into photodetector PD2 after passing back through objective lens OBJ3, half mirror HMR, quarter wave plate QWP, beam expander EXP and collimator COL, then reflected by dichroic prism DP and polarized beam splitter PBS2. Information signal, which is recorded onto the fourth optical disc OD4 is obtained by using the output signal of photodetector PD2.

Focal point detection and tacking detection are performed by detecting a light amount change caused by a shape change and position change of the spot formed on the photodetector. Based on this detection described above, a focusing actuator and a tracking actuator (not shown) of an objective lens actuator mechanism moves first objective lenses OBJ3 so that the light flux emitted from the third semiconductor laser LD3 is focused onto the information recording surface of the fourth optical disc OD4.

Further, beam expander EXP comprises plural optical elements and at least one optical element moves in an optical axis direction so as to change (here enlarge) an light flux diameter of parallel light flux from collimator COL. However beam expander EXP may have functions to correct chromatic aberration and spherical aberration as other functions. Chromatic aberration here is aberration caused by wavelength drift and spherical aberration is one of aberration of spherical aberration caused by the differences between the thickness of protective substrate of respective optical discs, spherical aberration caused by wavelength change, and spherical aberration caused by temperature change.

These aberration corrections are not limited to be performed by the beam expander having plural optical elements. Providing plural step difference structures on at least one of an optical surface may perform these aberration corrections. The step difference structure includes not only a phase structure described above but also a diffractive structure for decreasing aberration by causing diffraction action in an incident light flux, a phase structure for decreasing aberration by causing phase difference, a step difference structure in which both structures of the diffractive structure and the phase structure are on different optical surfaces, a step difference structure in which both structures of the diffractive structure and the phase structure are superimposed on a same optical surface, and a step difference structure including small steps therein having a wavelength selectivity. Here, beam expander EXP comprises plural optical element. However, it may be a single optical element.

The step difference structure may be provided not only on beam expander EXP but also other optical elements, such as collimator COL, etc., or objective lens OBJ3 (OBJ4).

Chromatic aberration and spherical aberration can be corrected by providing the beam expander EXP described above. Further, it becomes possible to select the information recording surface by moving optical element in light source side when high density DVD has dual layers of information recording surfaces. In FIGS. 9 and 10, PD1 and PD2 are separately provided. However, these photodetectors may be integrated into one sensor, which can be commonly used for from the first to the third light fluxe. If this is the case it is easily understand that PD2 and PDS2 which are shown in FIGS. 9 and 10, become unnecessary.

In FIGS. 9 and 10, collimator COL which is commonly used for these wavelengths. However, this collimator COL can be a collimator for two wavelengths for BD and for DVD/CD.

Further, in FIGS. 9 and 10, a half mirror is used to change the direction of a light flux to guide them to objective lenses OBJ3 and OBJ4. This structure is preferable to decrease the number of optical systems, however the structure is not limited to this structure.

Namely, the beams splitter used here may be an optical element having a structure to change an incident light flux to light fluxes traveling in plural directions so as to guide the incident light flux to each objective lens. The beam splitter is not limited to a half mirror which selectively transmits or reflects an incident light flux. For example, it may be a structure including a polarized beam separating an incident light flux into a light flux with a first polarized direction component of the incident light flux and a light flux with a second polarized direction component being different from the first polarized direction. In this case, in the configuration of an optical system illustrated in FIG. 9, PBS1 is necessary to be a half mirror.

FIG. 10 illustrates a configuration having two lens system including mirror MR for moving to guide blue-violet laser beams to objective lens OBJ3 for HD/DVD/CD and to objective lens OBJ4 for BD, which is the same as FIG. 9. Concretely, the configuration illustrated in FIG. 10 is excluded half mirror HMR from the configuration of FIG. 9 but provides a reflective mirror MR as a separating means moved by a driving means which is not shown between the first position for guiding a light flux to objective lens OBJ3 and the second position for guiding a light flux to objective lens OBJ4 corresponding to an optical disc to be used. Information recording and/or reproducing conducted in this example is same to an example illustrated in FIG. 9 in principle, except that almost of an incident light flux is reflected by mirror MR, which is different from the case using the half mirror. Therefore the detailed description is omitted below.

In the above embodiments, the first light source, for example semiconductor laser L1, and the second light source, for example semiconductor laser L2 or L3, are arranged without being layered, in the other words, the same optical path can be used for the first light source and the second light source. It improves flexibility of layout in the configuration.

Concrete examples of the embodiment described above will be described below. In the example blow, numerical apertures NA1=0.85 to 0.9, NA2=0.65 to 0.67, NA3=0.60 to 0.67 and NA4=0.45 tp 0.53. Further, HWL is a blaze wavelength of diffractive gratings, for example, a manufacturing wavelength of diffractive structure HOE. Power of 10, for example, $2.5 \times 10^{-3}$, will be expressed in 2.5 E-3, hereinafter.

The optical surface of the objective optical system is formed on an aspheric surface which is defined by formula (2) below when substituting the coefficients shown in Tables 2 to 19.

$$x(h) = \frac{(h^2/R)}{1 + \sqrt{1 - (1+\kappa)(h/R)^2}} + \sum_{i=0}^{9} A_{2i} h^{2i}$$

Where X(h) denotes an axis in the optical axis (a light flux traveling direction is defined as positive direction); $\kappa$ denotes a constant of cone; $A_{2i}$ denotes aspheric constant; and h denotes a height from the optical axis.

Optical path length given to a light flux of each wavelength by the diffractive structure is defined as following formula with substituted coefficient shown in Table 1.

$$\phi(h) = \sum_{i=0}^{5} C_i h^{2i}$$

Where $C_i$ is a coefficient of an optical path difference function (HOE coefficient).

EXAMPLE A

In Example A, the first objective lens is used to record and/or reproduce onto/from HD (the second optical disc) and DVD (the third optical disc) and the second objective lens is used to record/reproduce onto/from BD (the first optical disc) and CD (the fourth optical disc).

Examples 1 to 6 of the first objective optical lens in example A will be described.

Examples 1 to 4

The first objective lens is structured by a single plastic lens L1. Plural ring zones being diffractive structures DOE shown in FIGS. 1(a) and 1(b) are arranged on light source side surface S1, centering on an optical axis, each zone being formed in a sawtooth (it will be called diffractive structure DOE hereinafter). This phase structure is designed so that diffraction efficiency is to be the highest for the light flux with first wavelength $\lambda 1=405$ nm and the light flux with second wavelength $\lambda 2=655$ nm having diffraction orders shown in the following Table 1. Disc side surface S2 of single plastic lens L1 is an aspherical surface.

TABLE 1

Diffraction order on surface S1

| | 405 nm | 655 nm |
|---|---|---|
| Example 1 | second order | first order |
| Example 2 | third order | second order |
| Example 3 | fifth order | third order |
| Example 4 | eighth order | fifth order |

Next, the first objective lens will be described in detail below. Single lens L1 has refractive index nd of 1.5435, and Abbe's constant vd of 56.7 for d-line. Refractive index is 1.5601 at $\lambda 1=405$ nm, and refractive index is 1.54073 at $\lambda 2=655$ nm. Lens data of each example is shown in Tables 2-5. In the Tables 2-5, OD represents a distance from an object point to a surface peak of the first surface.

TABLE 2

(Example 1)

| | Wavelength = | 405 nm | 655 nm |
|---|---|---|---|
| | NA = | 0.65 | 0.65 |
| | OD = | ∞ | ∞ |

| Surface | Curvature Radius | Center Thickness | Refractive Index (405 nm) | Refractive Index (655 nm) |
|---|---|---|---|---|
| 1** | 1.5402 | 2.000 | 1.56013 | 1.54073 |
| 2* | −4.2240 | T2 | | |
| 3 | ∞ | 0.600 | 1.62100 | 1.58115 |
| 4 | ∞ | | | |

*Aspherical Surface
**HOE Surface

Variable Interval

| | 405 nm | 655 nm |
|---|---|---|
| T2 | 0.858 | 0.914 |

Diffraction Order on Surface S1

| 405 nm | 655 nm |
|---|---|
| Second Order | First Order |

Aspherical Surface

| | S1 | S2 |
|---|---|---|
| k | −0.66513 | −16.80709 |
| A4 | 7.80050E−03 | 4.67427E−02 |
| A6 | 1.78906E−03 | 2.19651E−02 |
| A8 | 6.27460E−05 | −7.10695E−03 |
| A10 | 2.38745E−05 | 1.57510E−02 |

TABLE 2-continued (Example 1)

| A12 | 7.21000E−06 | −6.21467E−03 |
|---|---|---|
| A14 | −1.56549E−05 | −6.77218E−05 |
| A16 | 9.50335E−06 | 3.79988E−04 |
| A18 | 0.00000E+00 | 0.00000E+00 |
| A20 | 0.00000E+00 | 0.00000E+00 |

HOE Coefficients

| | S1 |
|---|---|
| HWL | 405 nm |
| C1 | 0.00000E+00 |
| C2 | 5.23196E−04 |
| C3 | 1.33374E−04 |
| C4 | −6.38024E−05 |
| C5 | 2.66312E−05 |

TABLE 3

(Example 2)

| | Wavelength = | 405 nm | 655 nm |
|---|---|---|---|
| | NA = | 0.65 | 0.63 |
| | OD = | ∞ | ∞ |

| Surface | Curvature Radius | Center Thickness | Refractive Index (405 nm) | Refractive Index (655 nm) |
|---|---|---|---|---|
| 1** | 1.6070 | 2.202 | 1.56013 | 1.54073 |
| 2* | −3.3531 | T2 | | |
| 3 | ∞ | 0.600 | 1.62100 | 1.58115 |
| 4 | ∞ | | | |

*Aspherical Surface
**HOE Surface

Variable Interval

| | 405 nm | 655 nm |
|---|---|---|
| T2 | 0.800 | 0.853 | diffraction Order on Surface S1

| 405 nm | 655 nm |
|---|---|
| Third Order | Second order |

Aspherical Surface

| | S1 | S2 |
|---|---|---|
| k | −0.75407 | −11.85053 |
| A4 | 3.33991E−03 | 3.81099E−02 |
| A6 | −1.61614E−04 | −2.70432E−02 |
| A8 | 4.13403E−04 | −7.81934E−03 |
| A10 | −2.53734E−04 | 1.39152E−02 |
| A12 | −1.27507E−04 | −3.58225E−03 |
| A14 | 4.26650E−05 | −1.69101E−03 |
| A16 | −1.06779E−05 | 7.56285E−04 |
| A18 | 0.00000E+00 | 0.00000E+00 |
| A20 | 0.00000E+00 | 0.00000E+00 |

HOE Coefficients

| | S1 |
|---|---|
| HWL | 405 nm |
| C1 | −5.89635E−05 |
| C2 | −5.18929E−04 |
| C3 | −5.85886E−05 |
| C4 | 5.52495E−05 |
| C5 | −2.57030E−05 |

TABLE 4

(Example 3)

| | Wavelength = | 405 nm | 655 nm |
|---|---|---|---|
| | NA = | 0.65 | 0.65 |
| | OD = | ∞ | ∞ |

| Surface | Curvature Radius | Center Thickness | Refractive Index (405 nm) | Refractive Index (655 nm) |
|---|---|---|---|---|
| 1** | 1.4134 | 1.600 | 1.56013 | 1.54073 |
| 2* | −8.8805 | T2 | | |
| 3 | ∞ | 0.600 | 1.62100 | 1.58115 |
| 4 | ∞ | | | |

*Aspherical Surface
**HOE Surface

Variable Interval

| | 405 nm | 655 nm |
|---|---|---|
| T2 | 0.998 | 1.059 |

Diffraction Order on Surface S1

| 405 nm | 655 nm |
|---|---|
| Fifth order | Third order |

Aspherical Surface

| | S1 | S2 |
|---|---|---|
| k | −0.99987 | −129.35881 |
| A4 | −5.53350E−03 | 4.29075E−02 |
| A6 | −4.73304E−03 | −3.12849E−02 |
| A8 | −5.23193E−05 | −1.20021E−03 |
| A10 | −4.55887E−04 | 8.45338E−03 |
| A12 | −1.52723E−04 | −3.77194E−03 |
| A14 | 1.32991E−04 | −1.56690E−04 |
| A16 | −3.34796E−05 | 2.89077E−04 |
| A18 | 0.00000E+00 | 0.00000E+00 |
| A20 | 0.00000E+00 | 0.00000E+00 |

HOE Coefficients

| | S1 |
|---|---|
| HWL | 405 nm |
| C1 | 0.00000E+00 |
| C2 | −3.67150E−03 |
| C3 | −5.55326E−04 |
| C4 | 2.04081E−05 |
| C5 | 1.68669E−05 |

TABLE 5

(Example 4)

| | Wavelength = | 405 nm | 655 nm |
|---|---|---|---|
| | NA = | 0.65 | 0.65 |
| | OD = | ∞ | ∞ |

| Surface | Curvature Radius | Center Thickness | Refractive Index (405 nm) | Refractive Index (655 nm) |
|---|---|---|---|---|
| 1** | 1.4542 | 1.600 | 1.56013 | 1.54073 |
| 2* | −6.5027 | T2 | | |
| 3 | ∞ | 0.600 | 1.62100 | 1.58115 |
| 4 | ∞ | | | |

*Aspherical Surface
**HOE Surface

TABLE 5-continued (Example 4)

Variable Interval

| | 405 nm | 655 nm |
|---|---|---|
| T2 | 1.012 | 1.071 |

S1 Surface diffraction Order

| 405 nm | 655 nm |
|---|---|
| Eighth order | Fifth order |

Aspherical Surface

| | S1 | S2 |
|---|---|---|
| k | −0.77919 | −68.11607 |
| A4 | 5.19964E−03 | 5.38139E−02 |
| A6 | 2.72686E−03 | −2.44667E−02 |
| A8 | 2.64540E−03 | −1.01981E−03 |
| A10 | −3.67987E−04 | 7.72696E−03 |
| A12 | −5.99693E−04 | −3.97119E−03 |
| A14 | 7.01865E−05 | 4.65356E−03 |
| A16 | 5.91542E−05 | −1.63987E−03 |
| A18 | 0.00000E+00 | 0.00000E+00 |
| A20 | 0.00000E+00 | 0.00000E+00 |

HOE Coefficients

| | S1 |
|---|---|
| HWL | 405 nm |
| C1 | 0.00000E+00 |
| C2 | −9.51417E−04 |
| C3 | 1.63933E−04 |
| C4 | 5.09348E−05 |
| C5 | −4.94903E−05 |

Since NA for both optical discs are the same, which is NA 2, optical surface S1 of single lens L1 is structured in a single area. However, comparing area NA2 where the first light flux from the first semiconductor laser passes and area NA2 where the second light flux from the second semiconductor laser passes, area NA2 for the second light flux becomes lager because the first wavelength λ1 and the second wavelength λ2 which are wavelengths of using light fluxes are different (λ1<λ2). Therefore, optical surface S1 may be divided in to the first area AREA 1 including the optical axis and corresponding to area NA2 for the first light flux and the second area AREA 2 corresponding to an area from NA2 for the first light flux to NA2 for the second light flux and each area may have a different phase structure.

Diffractive structure DOE is a structure to secure compatibility for recording and/or reproducing information onto/from respective optical discs corresponding to the first light flux having wavelength λ1 and the second light flux having wavelength λ2. Diffractive structure DOE is also a structure to suppress chromatic aberration of an objective lens in blue-violet range and a spherical aberration change due to a temperature change, which are to be problems when single lens L1 is formed by a plastic lens.

In diffractive structure, height "d" of a step being the nearest to the optical axis is designed so that the diffraction efficiency of required order of the diffracted light flux for wavelength 400 nm to 420 nm becomes 100%. When the first light flux enters into diffractive structure DOE in which the depth of step is set as described above, diffracted light flux occurs with diffraction efficiency of not less than 95%, which is highly enough diffraction efficiency, and it becomes possible to correct chromatic aberration in a blue-violet range.

It is possible that, for example, in the case of that the height of step of a diffractive structure is designed so that when a light flux having wavelength of 400 nm enters into the diffractive structure, the diffraction efficiency of the second order diffraction beams becomes 100%, the allocation of the diffraction efficiency is possible so that plus second diffracted light flux occurs at about 97% diffraction efficiency when the first light flux enters into the structure, and plus first diffracted light flux occurs at about 94% diffraction efficiency when the second light flux enters into the structure. The same allocation of diffraction efficiency for the pair of other diffraction orders is possible and practically enough diffraction efficiency can be obtained. It is also possible to put more importance on the second light beam diffraction efficiency by optimizing the diffraction efficiency for the first wavelength of $\lambda 1$.

Further, diffractive structure DOE has a property that when the wavelength of an incident light flux becomes longer, the spherical aberration changes to an under corrected direction and when the wavelength become shorter, the spherical aberration changes to an over corrected direction. Consequently, it is possible to expand the temperature range available for a plastic and high NA objective lens by canceling spherical aberration changes caused in a converging element due to environmental temperature changes.

As described above, it becomes possible to make magnifications of each light flux M2 and M3 0 while maintaining compatibility over two kinds of optical discs with one objective lens. It is a preferable configuration since comma aberration caused by the lens-shift of tracking operation generated when recording and/or reproducing information onto/from the second optical disc and the third optical disc, is cancelled. In this example, diffractive structure DOE is provided on optical surface S1, however it is possible to provide diffractive structure DOE on optical surface S2.

Example 5

The first objective lens is structured by a single plastic lens L1 and both surfaces, light source side surface S1 and optical disc side S2 are aspherical surfaces. The first objective lens will be described in detail below. Single lens L1 has refractive index nd of 1.5435, and Abbe's constant vd of 56.7 for d-line. Refractive index is 1.5601 at $\lambda 1$=405 nm, and refractive index is 1.54073 at $\lambda 2$=655 nm. Lens data of example 5 is shown in Table 6.

TABLE 6

(Example 5)

| Wavelength = | 405 nm | 655 nm |
| NA = | 0.65 | 0.65 |
| OD = | ∞ | 107.771 |

| Surface | Curvature Radius | Center Thickness | Refractive Index (405 nm) | Refractive Index (655 nm) |
| --- | --- | --- | --- | --- |
| 1** | 1.5234 | 1.995 | 1.56013 | 1.54073 |
| 2* | −4.3388 | T2 | | |
| 3 | ∞ | 0.600 | 1.62100 | 1.58115 |
| 4 | ∞ | | | |

*Aspherical Surface
**HOE Surface

TABLE 6-continued (Example 5)

Variable Interval

| | 405 nm | 655 nm |
| --- | --- | --- |
| T2 | 0.844 | 0.953 |

Aspherical Surface

| | S1 | S2 |
| --- | --- | --- |
| k | −0.67048 | −23.28451 |
| A4 | 7.43388E−03 | 5.04706E−02 |
| A6 | 1.67442E−03 | −2.03530E−02 |
| A8 | 2.41860E−04 | −7.75119E−03 |
| A10 | 5.16096E−05 | 1.67787E−02 |
| A12 | 5.14899E−06 | −4.97488E−03 |
| A14 | −1.13488E−05 | −2.17347E−03 |
| A16 | 8.98861E−06 | 1.07034E−03 |
| A18 | 0.00000E+00 | 0.00000E+00 |
| A20 | 0.00000E+00 | 0.00000E+00 |

Example 6

The first objective lens is structured by single plastic lens L1. Since NA for both optical discs are the same, which is NA2, optical surface S1 of single lens L1 being a light source side, is structured in a single area. The optical surface S1 includes diffractive structure HOE having plural ring-shaped zones and each ring-shaped zone is formed by a step structure and is provided centering on an optical axis as shown in FIGS. 3(a) and 3(b). Based on this phase structure, a light flux with first wavelength $\lambda 1$=405 nm passes through the diffractive structure as a 0 order diffracted light flux without being diffracted, and a light flux with a second wavelength $\lambda 2$=655 nm is diffracted in a plus first order direction. Optical disc side surface S2 of single lens L1 is aspherical surface.

Next, the first objective lens will be described in detail below. Single lens L1 has refractive index nd of 1.5435, and Abbe's constant vd of 56.7 for d-line. Refractive index is 1.5601 at $\lambda 1$=405 nm, and refractive index is 1.54073 at $\lambda 2$=655 nm. Lens data of example 6 is shown in Table 7.

TABLE 7

(Example 6)

| Wavelength = | 405 nm | 655 nm |
| NA = | 0.65 | 0.65 |
| OD = | ∞ | ∞ |

| Surface | Curvature Radius | Center Thickness | Refractive Index (405 nm) | Refractive Index (655 nm) |
| --- | --- | --- | --- | --- |
| 1** | 1.5205 | 1.997 | 1.56013 | 1.54073 |
| 2* | −4.4880 | T2 | | |
| 3 | ∞ | 0.600 | 1.62100 | 1.58115 |
| 4 | ∞ | | | |

*Aspherical Surface
**HOE Surface

TABLE 7-continued (Example 6)

Variable Interval

| | 405 nm | 655 nm |
|---|---|---|
| T2 | 0.846 | 0.873 |

Diffraction Order on surface S1

| 405 nm | 655 nm |
|---|---|
| Zero Order | First Order |

Aspherical Surface

| | S1 | S2 |
|---|---|---|
| k | −0.67272 | −22.85678 |
| A4 | 7.29066E−03 | 4.94935E−02 |
| A6 | 1.66512E−03 | −2.12910E−02 |
| A8 | 2.22527E−04 | −7.93262E−03 |
| A10 | 3.07019E−05 | 1.70108E−02 |
| A12 | −3.22412E−06 | −4.88846E−03 |
| A14 | −1.31982E−05 | −2.16472E−03 |
| A16 | 1.03605E−05 | 1.06921E−03 |
| A18 | 0.00000E+00 | 0.00000E+00 |
| A20 | 0.00000E+00 | 0.00000E+00 |

HOE Coefficient

| | S1 |
|---|---|
| HWL | 655 nm |
| C1 | −2.55466E−03 |
| C2 | −3.08052E−04 |
| C3 | −1.14046E−05 |
| C4 | −7.90158E−06 |
| C5 | −2.77677E−06 |

Optical surface S1 of a laser source side of a semiconductor laser has a structure having diffractive structure HOE having plural ring-shaped zones. Each ring-shaped zones forms a step structure and is provided centering on an optical axis as shown in FIGS. 3(a) and 3(b).

In diffractive structure HOE1 formed in first area AREA1, the depth of a stepping structure D is set by a value calculated by following formula (12).

$$D \times (N1-1)/\lambda 1 = 2 \times q \quad (12)$$

Dividing number P being a number of steps in each ring zone is set to 5. Where, λ1 is an expression of a wavelength in a unit of micron of laser beams emitted from first emission point EP1, λ1=0.405 μm, and N1 denotes a refractive index of medium for wavelength λ1 and q denotes a natural integer.

When the first light flux having first wavelength of λ1 enters into the step structure having depth D, an optical path difference between adjacent stepping structures of 2×λ1 (μm) occurs. Since no phase difference is given to the first light flux, it passes through the step structure as it is, without being diffracted (in this specification it is called "zero order diffracted light flux).

When the second light flux having second wavelength λ2, where λ2=0.655 μm, enters into the step structure, the optical path difference between adjacent stepping structure of {2×λ1/(N1−1)×(N2−1)/λ2}×λ2={2×0.405/(1.5601−1)×(1.54073−1)/0.655}×λ2=1.194×λ2 μm occurs. Since the dividing number P is set to 5, the optical path difference between adjacent ring-shaped zones is one wavelength of second wavelength λ2 ((1.194−1)×5≈1), and the second light flux is diffracted in the plus first order direction (plus first diffracted light flux). At that time, the diffraction efficiency of the plus first diffracted light flux of the second light flux is about 87%, however it is enough light amount to record and/or reproduce information on/from DVD.

It becomes possible to make magnification factors M2 and M3 of light fluxes from one objective lens for two kinds of optical discs by using this diffractive structure HOE. Since comma aberration caused by lens shift of tracking operation when recording and/or reproducing information onto/from the second and the third optical discs, is suppressed, it is a preferable structure. In this example, diffractive structure HOE is provided on optical surface S1 of single lens L1 in a semiconductor laser source side surface S1, however diffractive structure HOE may be provided on optical disc side surface S2.

In example A, several examples of the second objective lens, which can be combined with the first example will be described will be described below.

Example 1

The second objective lens is structured by a single plastic lens L1. Light source side surface S1 is divided into first area AREA1 including an optical axis corresponding to an area in NA3 and second area AREA2 corresponding to an area from NA3 to NA1. First area AREA1 has plural ring-shaped zones centering on the optical axis, which have a sawtooth shaped diffractive structure (it will be called "diffractive structure DOE" hereinafter) as shown in FIGS. 1(a) and 1(b). This phase structure diffracts the light flux having wavelength λ1=405 nm as the second order diffracted light flux and the light flux having wavelength λ3=785 nm as the first order diffracted light flux. Second area AREA2 has a different structure of aspherical surface from an aspherical surface of a base structure of first area AREA1. Optical disc side surface S2 of single lens L1 has an aspherical surface.

Next, the second objective lens will be described in detail below. Single lens L1 has refractive index nd of 1.5435, and Abbe'S constant vd of 56.7 for d-line. Refractive index is 1.5601 at λ1=405 nm, and refractive index is 1.5601 at λ3=785 nm. Lens data of example 1 is shown in Table 8.

TABLE 8

(Example 1)

| Wavelength = | 405 nm | 785 nm |
|---|---|---|
| NA = | 0.85 | 0.50 |
| OD = | ∞ | 12.37 |

| Surface | Curvature Radius | Center Thickness | Refractive Index (405 nm) | Refractive Index (785 nm) |
|---|---|---|---|---|
| Stop | ∞ | 0.000 | | |
| 1** | 1.1576 | 2.153 | 1.56013 | 1.53724 |
| 1'* | 1.1610 | 2.153 | 1.56013 | 1.53724 |
| 2* | −2.3464 | T2 | | |
| 3 | ∞ | T3 | 1.62100 | 1.57446 |
| 4 | ∞ | | | |

*Aspherical Surface
**HOE Surface
1: First surface inside area
1': First surface outside area TABLE 8-continued (Example 1)

Variable Interval

| | 405 nm | 785 nm |
|---|---|---|
| T2 | 0.539 | 0.200 |
| T3 | 0.100 | 1.200 |

Diffraction Order

| | 405 nm | 785 nm |
|---|---|---|
| S1 | Second Order | First Order |

Aspherical Surface

| | S1 | S1' | S2 |
|---|---|---|---|
| k | −0.60089 | −0.77360 | −33.59071 |
| A4 | 1.90646E−02 | 1.76976E−02 | 1.62713E−01 |
| A6 | −1.53903E−03 | 9.19799E−03 | −9.13488E−02 |
| A8 | −2.99405E−03 | −9.59915E−05 | −9.46578E−02 |
| A10 | −3.54131E−02 | 1.27480E−03 | 1.63830E−01 |
| A12 | 5.54394E−02 | −1.71501E−04 | −7.76805E−02 |
| A14 | −3.29492E−02 | 2.41095E−05 | 3.44222E−04 |
| A16 | 8.45833E−03 | 4.09152E−05 | 6.74833E−03 |
| A18 | 0.00000E+00 | 2.31777E−05 | 0.00000E+00 |
| A20 | 0.00000E+00 | −1.30878E−05 | 0.00000E+00 |

HOE Coefficient

| | S1 |
|---|---|
| HWL | 405 nm |
| C1 | 8.59064E−04 |
| C2 | 2.75675E−03 |
| C3 | 3.47508E−04 |
| C4 | −7.66015E−03 |
| C5 | 4.09148E−03 |

Second area AREA2 of semiconductor laser light source side of single lens L1 does not have a phase structure, however a phase structure different from the phase structure of first area AREA1 may be provide in second area AREA2.

Diffractive structure DOE is a structure to secure compatibility for recording and/or reproducing information onto/from an optical disc for the first light flux having wavelength λ1 and the third light flux having wavelength λ3. Diffractive structure DOE is also a structure to suppress chromatic aberration of an objective lens in blue-violet range and a spherical aberration change due to a temperature change, which are to be problems when single lens L1 is formed by a plastic lens.

In diffractive structure, height "d1" of a step being the nearest to the optical axis is designed so that the diffraction efficiency of required order of diffracted light flux for wavelength 400 nm to 420 nm becomes 100%. When the first light flux enters into diffractive structure DOE in which the depth of step is set as described above, diffracted light flux occurs with diffraction efficiency of not less than 95%, which is highly enough diffraction efficiency, and it becomes possible to correct chromatic aberration in a blue-violet range.

It is possible that, for example, in the case of that the height of step of a diffractive structure is designed so that when a light flux having wavelength of 400 nm enters into the diffractive structure, the diffraction efficiency of the second order diffracted light flux becomes 100%, the allocation of the diffraction efficiency is possible so that plus second diffracted light flux occurs at about 97% diffraction efficiency when the first light flux enters into the structure, and plus first diffracted light flux occurs at about 94% diffraction efficiency when the second light flux enters into the structure. The same allocation of diffraction efficiency for the pair of other diffraction orders is possible and practically enough diffraction efficiency can be obtained. It is also possible to put more weight on the second light flux diffraction efficiency by optimizing the diffraction efficiency for the first wavelength of λ1.

When allowing diffractive structure DOE to have property that when the wavelength of an incident light flux become longer, the spherical aberration changes to the under corrected direction and when the wavelength become shorter, the spherical aberration changes to the over corrected direction, it is possible to expand the temperature range by canceling spherical aberration changes caused in a plastic and high NA objective lens due to environmental temperature changes.

The width of each ring-shaped zone of diffractive structure DOE provided on semiconductor laser light source side optical surface S1 of single lens L1 is set so that the spherical aberration for plus first order diffracted light flux is corrected under corrected direction by the diffraction action while the magnification factor M4=−0.166, which is a finite magnification factor against the third light flux. The third light flux passed through diffractive structure DOE and a protective substrate of CD forms a appropriate light spot on a recording surface of a CD by canceling an spherical aberration amount added by diffractive structure DOE and an spherical aberration in an over-corrected direction caused by the thickness difference between the protective substrate of BD and the protective substrate of CD. In this example, diffractive structure DOE is provided on optical surface S1, however diffractive structure S2 may be provided in optical surface S2.

Example 2

The second objective lens comprises plastic lens L1 and glass lens L2. Diffractive structure HOE having a structure on which plural ring-shaped zones. Each ring-shaped zone forms a step structure and is provided centering on the optical axis plastic lens L1 as shown in FIGS. 3(a) and 3(b) on disc side surface S2 of plastic lens L1. Diffractive structure HOE does not diffract the first light flux having wavelength λ1=405 nm and the first light flux passes through the diffractive structure DOE as a 0th order diffracted light flux. Diffractive structure HOE diffracts the third light flux having wavelength λ3=780 nm in a plus first order direction. Even though it is eliminated in the example, a ring-shaped zone structure shown in FIGS. 2(a), 2(b), 4(a) and 4(b). The first light flux having wavelength λ1=405 nm and the third light flux having wavelength λ3=780 nm pass through the ring-shaped zone structure without diffraction. When the wavelength change from the nominal value used when designed, such as wavelength error of a semiconductor laser, wavelength change of the semiconductor laser due to the temperature rise when the optical pickup apparatus is in actual use, etc., the ring-shaped zone structure corrects the aberration caused by the wavelength difference or the temperature difference described above. The base surface shape of optical surface S1 is a flat and the base surface shape of optical surface S2 is a concave spherical surface. The bases surface may be a surface other than a plain surface or a spherical surface. For example, by making the base surface into an aspherical surface, it increases the flexibility to correct out-of-axis aberration and to control higher order aberration etc.

Lens L2 is a dual-face aspherical lens of structured by a glass mold and designed so that the spherical aberration determined by the combination with a finite magnification factor determined by a concave surface and a BD protective substrate becomes the minimum value. When setting first magnification factor M1 for the first light flux and the fourth magnification factor M4 for the third light flux to zero, the third light flux passed through the CD protective substrate changed in an over corrected direction without the phase structure. In this example, setting a magnification factor for the third light flux to a finite magnification factor cancels and corrects over corrected spherical aberration of the third light flux is cancelled out and corrected by direction caused by the thickness difference between a protective substrate of BD and a protective substrate of CD.

Next, the second objective lens will be described in detail below. Lens L1 is a plastic lens having refractive index nd of 1.54087, and Abbe's constant vd of 56.3 for d-line. Refractive index is 1.52403 at $\lambda1$=405 nm, and refractive index is 1.50261 at $\lambda3$=780 nm. Lens L2 is a glass mold lens having refractive index nd of 1.61544, and Abbe's constant vd of 60.0 for d-line. Data of example 2 is shown in Table 9.

TABLE 9

(Example 2)

| Wavelength = | 405 nm | 780 nm |
|---|---|---|
| NA = | 0.85 | 0.49 |
| OD = | ∞ | ∞ |

| Surface | Curvature Radius | Center Thickness | Refractive Index (405 nm) | Refractive Index (780 nm) |
|---|---|---|---|---|
| 1 | ∞ | 1.000 | 1.52403 | 1.50261 |
| 2** | 20.6120 | 0.200 | | |
| Stop | ∞ | 0.000 | | |
| 3* | 1.3606 | 2.350 | 1.63279 | 1.60854 |
| 4* | −3.0500 | T4 | | |
| 5 | ∞ | T5 | 1.62100 | 1.57466 |
| 6 | ∞ | | | |

*Aspherical Surface
**HOE Surface

Variable Interval

| | 405 nm | 780 nm |
|---|---|---|
| T4 | 0.651 | 0.300 |
| T5 | 0.100 | 1.200 |

Diffraction Order

| | 405 nm | 785 nm |
|---|---|---|
| S2 | Zero Order | First Order |

Aspherical Surface

| | S3 | S4 |
|---|---|---|
| k | −0.80218 | −48.60938 |
| A4 | 1.31769E-02 | 9.86078E-02 |
| A6 | 3.92899E-03 | −5.69812E-02 |
| A8 | −8.60318E-04 | −2.82327E-02 |
| A10 | 6.17336E-04 | 4.82157E-02 |
| A12 | −3.33724E-05 | −2.01834E-02 |
| A14 | 1.69135E-06 | 1.70182E-03 |
| A16 | −9.41072E-06 | 4.96361E-04 |

TABLE 9-continued (Example 2)

| A18 | 0.00000E+00 | 0.00000E+00 |
|---|---|---|
| A20 | 0.00000E+00 | 0.00000E+00 |

HOE Coefficient

| | S1 |
|---|---|
| HWL | 780 nm |
| C1 | 3.42680E-02 |
| C2 | −2.56626E-03 |
| C3 | 2.52626E-03 |
| C4 | −1.77182E-03 |
| C5 | 5.29191E-04 |

When combining lens L1 and lens L2 into a single body, it is natural that a separated lens barrel is used to support a lens. However, it is possible to have a structure having a flange on the circumference of the optical functional portion of lens L1, (through which the first light flux passes) and connecting the flange with lens L2 to combine them into one body by welding or adhering.

Optical surface S2 of lens L1 is divided first area AREA3 including an optical axis corresponding to an area of NA3 and second area AREA4 corresponding from NA3 to NA1 as shown in FIG. 8(c). First area AREA3 has a structure having diffractive structure HOE having plural ring-shaped zones. Each ring-shaped zone forms a step structure and is provided centering on an optical axis as shown in FIGS. 3(a) and 3(b).

In diffractive structure HOE formed in third area AREA3, the depth of a step structure D (μm) is set by a value calculated by following formula (13).

$$D \times (N1-1)/\lambda1 = 1 \times q \tag{13}$$

Dividing number P being a number of steps in each ring-shaped zone is set to 2. Where, $\lambda1$ is an expression of a wavelength in a unit of micron of a light flux emitted from first emission point EP1, $\lambda1$=0.405 μm, and N1 denotes a refractive index of medium for wave length $\lambda1$ and q denotes a natural integer.

When the first light flux having first wavelength of $\lambda1$ enter into the step structure having depth of D, an optical path difference between adjacent stepping structures of $1 \times \lambda1$ (μm) occurs. Since no phase difference is given to the first light flux, it passes through the step structure as it is, without being diffracted as a zero order diffracted light flux.

When the third light flux having third wavelength $\lambda3$, where $\lambda3$=0.780 μm, enters into step structure, the optical path difference between adjacent step structure of $\{1 \times \lambda1/(N1-1) \times (N3-1)/\lambda3\} \times \lambda3 = \{1 \times 0.405/(1.52403-1) \times (1.50261-1)/0.780\} \times \lambda3 = 0.498 \times \lambda3$ (μm) occurs. Since the dividing number P is set to 2, the third light flux is diffracted in the ±first order direction (plus first order diffracted light flux and minus first order diffracted light flux). At that time, the diffraction efficiency of the plus first order diffracted light flux of the second light flux is a little over 40%, and minus first order diffraction light flux becomes flare light.

It is possible to improve the diffraction efficiency of plus first order diffracted light flux by optimizing the slant made between a surface of the stepped shape parallel to an optical axis and a surface not being in parallel to the optical axis, for example, by deforming the surface not being in parallel to the optical axis to a surface which is deemed to be a preferable from the point of wavefront aberration. It is also possible to raise the efficiency by changing the medium dispersion of the material forming lens L1 and dividing number P of the stepping shape.

Optical surface S2 of lens L1 is divided into first area AREA1 including an optical axis corresponding to an area of NA3 and second area AREA2 corresponding to from NA3 to NA4 as shown in FIGS. 8(a) to 8(c). It becomes possible to increase flexibility by incorporating plural ring-shaped zones having different phase-functions therewith, which is provided centering on an optical axis.

Each ring-shaped zone width of diffractive structure HOE provided on optical surface S2 located in an optical disc side of lens L1 is designed to add spherical aberration in an under correction direction against plus first order diffracted light flux based on diffraction action. The third light flux passed through diffractive structure DOE and a protective substrate of CD form a appropriate light spot on a recording surface of CD by canceling spherical aberration in an over-corrected direction caused by the thickness difference between protective substrate of BD and the protective substrate of CD.

It becomes possible to make magnification factors M1 and M4 of light fluxes from one objective lens for two kinds of optical discs zero by using this diffractive structure HOE. Since comma aberration caused by lens shift of tracking operation when recording and/or reproducing information onto/from the first and the fourth optical discs, is suppressed, it is a preferable structure. In this example, diffractive structure HOE is provided on lens L1, however diffractive structure HOE may be provided on lens L2.

Further, a diffractive structure having plural ring-shaped zone shaped in a sawtooth shape in a cross section including an optical axis may be formed in first area AREA1 and second area AREA2 in semiconductor laser light source side and optical surface S2 in an optical disc side. The diffractive structure DOE is a structure to suppress chromatic aberration of an objective lens.

In diffractive structure, height "d1" of a step being the nearest to the optical axis is designed so that the diffraction efficiency of required order of diffracted light flux for wavelength 400 nm to 420 nm becomes 100%. When the first light flux enters into diffractive structure DOE 1 in which the depth of the step is set as described above, diffracted light flux occurs with diffraction efficiency of not less than 95%, which is highly enough diffraction efficiency, and it becomes possible to correct chromatic aberration in a blue-violet range.

The second objective lens of the example of the invention does not have diffractive structure DOE, however diffractive structure DOE may be provided on an optical surface of lens L2. Diffractive structure DOE may be a structure, which is provided on an entire optical surface of lens L2 as a one area or an optical surface of lens L2 having diffractive structure DOE thereon may be divided into two areas centering on the optical axis, each of which has a different diffractive structure DOE each other. The diffraction efficiency of the each area, where the first light flux and the third light flux passes through, may be arranged to be balanced. Or a structure on which the importance of the diffraction efficiency for the first light flux is attached by optimizing the efficiency against the first wavelength λ1.

In lens L1 of the example of the invention, diffractive structure HOE is provided on optical surface S2 of an optical disc. However, diffractive structure HOE may be provide on optical surface S1.

EXAMPLE B

In Example B, the first objective lens is used for HD (the second optical disc) and CD (the fourth optical disc), and the second objective lens is used for BD (the first optical disc) and DVD (the third optical disc).

Examples 1-4 of the first objective lens in Example B will be described.

Examples 1 and 2

The first objective lens is structured by a single plastic lens L1. Plural ring-shaped zones being diffractive structures DOE as shown in FIGS. 1(a) and 1(b) are arranged on light source side surface S1, centering on an optical axis, each zone being formed in a sawtooth (it will be called diffractive structure DOE hereinafter) in a light source side on the single plastic lens L1. This phase structure diffracts first wavelength λ1=405 nm as the second order light flux and third wavelength λ3=785 nm as the first light flux. Disc side surface S2 of single plastic lens L1 is an aspherical surface.

Next, the first objective lens will be described in detail below. Single lens L1 has refractive index nd of 1.5435, and Abbe's constant νd of 56.7 for d-line. Refractive index is 1.5601 at λ1=405 nm, and refractive index is 1.54072 at λ3=785 nm. Lens data of examples 1 and 2 are shown in Tables 10 and 11, respectively.

TABLE 10

(Example 1)

| Wavelength = | 405 nm | 785 nm |
|---|---|---|
| NA = | 0.65 | 0.49 |
| OD = | ∞ | ∞ |

| Surface | Curvature Radius | Center Thickness | Refractive Index (405 nm) | Refractive Index (785 nm) |
|---|---|---|---|---|
| 1** | 1.2100 | 1.861 | 1.56013 | 1.53724 |
| 2* | −29.1691 | T2 | | |
| 3 | ∞ | T3 | 1.62100 | 1.57446 |
| 4 | ∞ | | | |

*Aspherical Surface
**HOE Surface

Variable Interval

| | 405 nm | 785 nm |
|---|---|---|
| T2 | 0.763 | 0.456 |
| T3 | 0.600 | 1.200 |

Diffraction Order of surface S1

| 405 nm | 785 nm |
|---|---|
| Second Order | First Order |

Aspherical Surface

| | S1 | S2 |
|---|---|---|
| k | −1.56992 | −153.67000 |
| A4 | −5.37740E−02 | 1.97724E−01 |
| A6 | −4.10371E−02 | −4.35616E−01 |
| A8 | −1.36342E−03 | 1.65709E−01 |
| A10 | −3.34594E−04 | 1.11318E−01 |
| A12 | −5.92817E−04 | −6.92612E−02 |
| A14 | 9.69128E−04 | −7.45337E−03 |
| A16 | −1.56218E−04 | 3.44208E−03 |
| A18 | −9.53834E−06 | 0.00000E+00 |
| A20 | 0.00000E+00 | 0.00000E+00 |

HOE Coefficients

| | S1 |
|---|---|
| HWL | 405 nm |
| C1 | 9.47535E−03 |
| C2 | −3.87396E−02 |
| C3 | −6.36783E−03 |

TABLE 10-continued (Example 1)

| | |
|---|---|
| C4 | 1.04217E−03 |
| C5 | 2.68472E−04 |

TABLE 11

(Example 2)

| | | |
|---|---|---|
| Wavelength = | 405 nm | 785 nm |
| NA = | 0.65 | 0.49 |
| OD = | ∞ | ∞ |

| Surface | Curvature Radius | Center Thickness | Refractive Index (405 nm) | Refractive Index (785 nm) |
|---|---|---|---|---|
| 1** | 1.1544 | 1.816 | 1.56013 | 1.53724 |
| 2* | 6.2813 | T2 | | |
| 3 | ∞ | T3 | 1.62100 | 1.57446 |
| 4 | ∞ | | | |

*Aspherical Surface
**HOE Surface

Variable Interval

| | 405 nm | 785 nm |
|---|---|---|
| T2 | 0.704 | 0.400 |
| T3 | 0.600 | 1.200 |

Diffraction Order of surface S1

| 405 nm | 785 nm |
|---|---|
| Second Order | First Order |

Aspherical Surface

| | S1 | S2 |
|---|---|---|
| k | −1.28995 | 22.07844 |
| A4 | −3.58997E−02 | 2.03360E−01 |
| A6 | −3.51241E−02 | −4.70664E−01 |
| A8 | −1.49465E−03 | 2.03945E−01 |
| A10 | −2.84506E−03 | 1.79438E−02 |
| A12 | 9.21710E−05 | −1.29818E−01 |
| A14 | 1.12343E−03 | 7.95760E−02 |
| A16 | −2.27906E−04 | 4.43875E−02 |
| A18 | 1.52130E−06 | 0.00000E+00 |
| A20 | 0.00000E+00 | 0.00000E+00 |

HOE Coefficients

| | S1 |
|---|---|
| HWL | 405 nm |
| C1 | 4.75132E−03 |
| C2 | −3.16579E−02 |
| C3 | −7.03900E−03 |
| C4 | −3.10506E−05 |
| C5 | 7.08254E−04 |

Optical surface S1 of single lens L1 in a semiconductor laser light source side is configured by a single area. However, optical surface S1 may be divided into first area AREA1 corresponding to an area in NA3 including an optical axis of single lens L1 and second area AREA2 corresponding for NA3 to NA2, each area having a different phase structure from each other.

Diffractive structure DOE is a structure to secure compatibility for recording and/or reproducing information onto/from an optical disc for the first light flux having wavelength λ1 and the third light flux having wavelength λ3. Diffractive structure DOE is also a structure to suppress chromatic aberration of an objective optical lens in blue-violet range and a spherical aberration change due to a temperature change, which are to be problems when single lens L1 is formed by a plastic lens.

In diffractive structure, height "d" of a step being the nearest to the optical axis is designed so that the diffraction efficiency of required order of diffracted light flux for wavelength 400 nm to 420 nm becomes 100%. When the first light-flux enters into diffractive structure DOE in which the depth of step is set as described above, diffracted light flux occurs with diffraction efficiency of not less than 95%, which is highly enough diffraction efficiency, and it becomes possible to correct chromatic aberration in a blue-violet range.

It is possible that, for example, in the case of that the height of step of a diffractive structure is designed so that when a light flux having wavelength of 400 nm enters into the diffractive structure, the diffraction efficiency of the second order diffracted light flux becomes 100%, the allocation of the diffraction efficiency is possible so that plus second diffracted light flux occurs at about 97% diffraction efficiency when the first light flux enters into the structure, and plus first diffracted light flux occurs at about 94% diffraction efficiency when the second light flux enters into the structure. It is also possible to put more importance on the second light flux diffraction efficiency by optimizing the diffraction efficiency for the first wavelength of λ1.

Further, diffractive structure DOE has property that when the wavelength of incident light flux becomes longer, the spherical aberration changes to an under-corrected direction and when the wavelength become shorter, the spherical aberration changes to a over-corrected direction. Consequently, it is possible to expand the temperature range by canceling spherical aberration changes caused in a condensing element due to environmental temperature changes.

Each ring-shaped zone width of diffractive structure HOE provided on optical surface S2 located in an optical disc side of lens L1 is designed to add spherical aberration in an under corrected direction against plus first order diffracted light flux based on diffraction action. The third light flux passed through diffractive structure DOE and a protective substrate of CD form a appropriate light spot on a recording surface of a CD by canceling spherical aberration in an over-corrected direction caused by the thickness difference between the protective substrate of BD and the protective substrate of CD.

It becomes possible to make magnification factors M2 and M4 of light fluxes from one objective lens for two kinds of optical discs zero by using this diffractive structure HOE. Since comma aberration caused by lens shift of tracking operation when recording and/or reproducing information onto/from the first and the second optical discs, is suppressed, it is a preferable structure. In this example, diffractive structure HOE is provided on optical surface S1, however diffractive structure HOE may be provided on optical surface S2.

Example 3

The first objective lens is configured by a plastic single lens L1, whose optical source side surface S1 and optical disc side surface S2 are aspherical surfaces.

Next, the first objective lens will be described in detail below. Single lens L1 is a plastic lens having refractive index nd of 1.5435, and abbe constant νd of 56.7 for d-line. Refractive index is 1.5601 at λ=405 nm, and refractive index is 1.5372 at λ3=785 nm. Lens L2 is a glass mold lens having refractive index nd of 1.5372. Lens data of example 3 is shown in Tables 12.

TABLE 12

(Example 3)

| Wavelength = | 405 nm | 785 nm |
|---|---|---|
| NA = | 0.65 | 0.49 |
| OD = | ∞ | 25.067 |

| Surface | Curvature Radius | Center Thickness | Refractive Index (405 nm) | Refractive Index (785 nm) |
|---|---|---|---|---|
| 1** | 1.5142 | 1.998 | 1.56013 | 1.53724 |
| 2* | −4.4264 | T2 | | |
| 3 | ∞ | T3 | 1.62100 | 1.57446 |
| 4 | ∞ | | | |

*Aspherical Surface
**HOE Surface

Variable Interval

| | 405 nm | 785 nm |
|---|---|---|
| T2 | 0.835 | 0.766 |
| T3 | 0.600 | 1.200 |

S1 Surface Diffraction Order

| 405 nm | 785 nm |
|---|---|
| Zero Order | Zero Order |

Aspherical Surface

| | S1 | S2 |
|---|---|---|
| k | −0.67313 | −19.38893 |
| A4 | 7.12636E−03 | 5.13723E−02 |
| A6 | 1.81377E−03 | −1.67768E−02 |
| A8 | 2.44550E−04 | −5.65668E−03 |
| A10 | 8.60493E−05 | 1.77117E−02 |
| A12 | 3.48682E−05 | −7.79542E−03 |
| A14 | −4.33546E−06 | −1.24038E−03 |
| A16 | 7.41536E−06 | 1.07034E−03 |
| A18 | 0.00000E+00 | 0.00000E+00 |
| A20 | 0.00000E+00 | 0.00000E+00 |

Single lens L1 is designed so that the spherical aberration of single lens L1 expresses minimum value against the combination of magnification factor M2=0 with a single lens itself and a protective substrate of HD. Consequently, as the example of the present invention, when setting both second magnification factor M2 for the first light flux and fourth magnification factor M4 for the third light flux zero, the spherical aberration for the third light flux passed through an objective lens and a protective substrate of CD changes to an under corrected direction based on the thickness difference between the protective substrate of HD and the protective substrate of CD. In this example, setting a magnification factor for the third light flux to a finite magnification factor cancels and corrects spherical aberration being in a over corrected direction caused by the thickness difference between the protective substrate of HD and the protective substrate of CD.

Example 4

The first objective lens is structured by a single plastic lens L1. Light source side optical surface S1 is divided into first area AREA1 including an optical axis corresponding to an area in NA3 and second area AREA2 corresponding to an area from NA3 to NA2. First area AREA1 has diffractive structure HOE including plural ring-shaped zones. Each ring-shaped zone forms a step structure and is centering on the optical axis as shown in FIGS. 3(a) and 3(b). This phase structure does not diffract but passes the light flux having wavelength λ1=405 nm as a zero order diffracted light flux and diffracts light flux having wavelength λ3=785 nm in a plus first order diffracted light flux direction. Second area AREA2 of semiconductor laser side optical surface S1 is a flat surface and another phase structure may be provided therein.

Next, the objective lens will be described in detail below. Single lens L1 has refractive index nd of 1.5435, and Abbe's constant vd of 56.7 for d-line. Refractive index is 1.5601 at λ1=405 nm, and refractive index is 1.5601 at λ3=785 nm. Lens data of example 4 is shown in Table 13.

TABLE 13

(Example 4)

| Wavelength = | 405 nm | 785 nm |
|---|---|---|
| NA = | 0.65 | 0.49 |
| OD = | ∞ | ∞ |

| Surface | Curvature Radius | Center Thickness | Refractive Index (405 nm) | Refractive Index (785 nm) |
|---|---|---|---|---|
| 1** | 1.5126 | 1.986 | 1.56013 | 1.53724 |
| 2* | −4.5821 | T2 | | |
| 3 | ∞ | T3 | 1.62100 | 1.57446 |
| 4 | ∞ | | | |

*Aspherical Surface
**HOE Surface

Variable Interval

| | 405 nm | 785 nm |
|---|---|---|
| T2 | 0.845 | 0.660 |
| T3 | 0.600 | 1.200 |

Diffraction Order of Surface S1

| 405 nm | 785 nm |
|---|---|
| Zero Order | First Order |

Aspherical Surface

| | S1 | S2 |
|---|---|---|
| k | −0.67223 | −19.65528 |
| A4 | 7.20022E−03 | 5.13667E−02 |
| A6 | 1.80985E−03 | −1.71766E−02 |
| A8 | 2.50216E−04 | −6.20098E−03 |
| A10 | 8.09347E−05 | 1.76293E−02 |
| A12 | 3.42477E−05 | −8.33342E−03 |
| A14 | −6.15887E−06 | −8.65929E−04 |
| A16 | 6.09601E−06 | 1.07034E−03 |
| A18 | 0.00000E+00 | 0.00000E+00 |
| A20 | 0.00000E+00 | 0.00000E+00 |

HOE Coefficients

| | S1 |
|---|---|
| HWL | 785 nm |
| C1 | 1.08071E−02 |
| C2 | −4.46747E−04 |
| C3 | −2.16462E−04 |
| C4 | 7.67902E−05 |
| C5 | −1.89784E−05 |

Optical surface S1 in semiconductor laser light source side of single lens L1 may be divided into first area AREA1 corresponding to an area in NA3 including an optical axis of single lens L1 and second area AREA2 corresponding to am area from NA3 to NA2 as shown FIGS. 8(a) to 8(c). Diffractive structure HOE having plural ring-shaped zones in which a step structure is arranged centering on optical axis is provided in first area AREA1 as shown in FIGS. 3(a) and 3(b).

In diffractive structure HOE formed in third area AREA1, the depth of stepping structure D is set by a value calculated by following formula (14).

$$D \times (N1-1)/\lambda 1 = 2 \times q \quad (14)$$

Dividing number P being a number of stepping structure in each zone is set to 2. Where, $\lambda 1$ is an expression of a wavelength in a unit of micron of the light flux emitted from first emission point EP1, $\lambda 1 = 0.405$ μm, and N1 denotes a refractive index of medium for wavelength $\lambda 1$ and q denotes a natural integer.

When the first light flux having first wavelength of $\lambda 1$ enters into the stepping structure having depth of D, an optical path difference between adjacent stepping structures of $1 \times \lambda 1$ (μm) occurs. Since no phase difference is given to the first light flux, it passes through the step structure as it is, without being diffracted as zero order diffracted light flux.

When the third light flux having third wavelength $\lambda 3$, where $\lambda 3 = 0.785$ μm, enters into stepping structure, the optical path difference between adjacent stepping structure of $\{1 \times \lambda 1/(N1-1) \times (N3-1)/\lambda 3\} \times \lambda 3 = \{1 \times 0.405/(1.5601-1) \times (1.5372-1)/0.785\} \times \lambda 3 = 0.495 \times \lambda 3$ (μm) occurs. Since the dividing number P is set to 2, the third light flux is diffracted in the ±first order direction (plus first diffraction beams and −first diffraction beams). At that time, the diffraction efficiency of the plus first diffracted light flux of the second light flux is a little over 40%, and minus first order diffracted light flux becomes flare light.

It is possible to improve the diffraction efficiency of plus first order diffracted light flux by optimizing the slant made between a surface of the step shape parallel with an optical axis and a surface not being in parallel to the optical axis, for example, by deforming the surface not being in parallel to the optical axis to a surface which is deemed to be a preferable from the point of wavefront aberration. It is also possible to raise the efficiency by changing the medium dispersion of the material forming lens L1 and dividing number P of the stepping shape.

Examples of 1 and 2 of the second objective lens which can be combined with the first objective lens in example B will be described below.

Example 1

The second objective lens has two plastic lenses, which are lens L1 and lens L2 from a light source side. Lens L1 has a diffraction type phase structure on both surfaces. There is provide diffractive structure HOE on optical light source side surface S1 of lens L1, which includes plural ring-shaped zones centering on the optical axis, the ring zones having stepping structures as shown in FIGS. 3(a) and 3(b). The phase structure does not diffract but passes the first light flux having wavelength $\lambda 1 = 405$ nm as zero order diffracted light flux and diffracts the second light flux having wavelength $\lambda 2 = 780$ nm in a plus first order direction. A ring-shaped zone structure shown in FIGS. 2(a), 2(b), 4(a) and 4(b) is provided on optical disc side surface S2 of lens L1. This phase structure does not diffract but passes the light flux having wavelength $\lambda 1 = 405$ nm as well as the light flux having wavelength $\lambda 2 = 655$ without diffraction. When the wavelength change from the nominal value used when designed, such as wavelength error of a semiconductor laser, wavelength change of the semiconductor laser due to the temperature rise when the optical pickup apparatus is in actual use, etc., the ring-shaped zone structure corrects the aberration caused by the wavelength difference or the temperature difference described above. The base surface shape of optical surface S1 is a flat and the base surface shape of optical surface S2 is a concave spherical surface. The bases surface may be a surface other than a plain surface or a spherical surface. For example, by making the base surface into an aspherical surface, it increases the degree of freedom to correct out-of-axis aberration and to control higher order aberration etc.

Next, the second objective lens will be described in detail below. Lens L1 is a plastic lens having refractive index nd of 1.5091 for d-line, Abbe's constant vd of 56.4, refractive index of 1.52469 at $\lambda 1 = 405$ nm and refractive index of 1.50650 at $\lambda 2 = 655$ nm. Lens L2 is a plastic lens having refractive index nd of 1.5435 for d-line and Abbe's constant vd of 56.7. A flange formed together with each optical functional portion of respective areas of lens L1 and lens L2, through which the first light flux passes, is provided around the optical functional portion. A portion of the flange connects both lens L1 and lens L2 into one body. When combining lens L1 and lens L2 into one body, a lens barrel may be used. The lens data of lenses used in Example 1 is shown in Table 14.

TABLE 14

(Example 1)

| Wavelength = | 405 nm | 655 nm |
|---|---|---|
| NA = | 0.85 | 0.66 |
| OD = | ∞ | ∞ |

| Surface | Curvature Radius | Center Thickness | Refractive Index (405 nm) | Refractive Index (655 nm) |
|---|---|---|---|---|
| 1** | −4.1841 | 1.000 | 1.52469 | 1.50650 |
| 2** | −4.1735 | 0.750 | | |
| Stop | ∞ | 0.000 | | |
| 3* | 1.1687 | 2.223 | 1.56013 | 1.54073 |
| 4* | −3.3479 | T4 | | |
| 5 | ∞ | T5 | 1.62100 | 1.58115 |
| 6 | ∞ | | | |

*Aspherical Surface
**HOE Surface

Variable Interval

| | 405 nm | 655 nm |
|---|---|---|
| T4 | 0.500 | 0.315 |
| T5 | 0.100 | 0.600 |

Diffraction Order

| | 405 nm | 655 nm |
|---|---|---|
| S1 | Zero Order | First Order |
| S2 | Zero Order | Zero Order |

Aspherical Surface

| | S1 | S2 | S3 | S4 |
|---|---|---|---|---|
| k | 0.00000 | 0.00000 | −0.74960 | −257.40862 |
| A4 | 9.21120E−03 | 7.56578E−03 | 2.89588E−02 | 2.14567E−01 |
| A6 | 1.06602E−03 | 1.19880E−04 | 5.32239E−03 | −1.54711E−01 |
| A8 | 8.93656E−04 | 8.40837E−04 | 2.53757E−03 | −9.90315E−02 |
| A10 | 5.31240E−04 | 2.80772E−04 | 1.89327E−03 | 1.40823E−01 |
| A12 | −1.22392E−04 | −1.32266E−05 | −4.56698E−04 | 6.12036E−02 |
| A14 | 0.00000E+00 | −4.13058E−05 | −1.78867E−05 | −1.27759E−01 |

TABLE 14-continued (Example 1)

| | | | | |
|---|---|---|---|---|
| A16 | 0.00000E+00 | 1.91816E−05 | 1.50238E−04 | 4.10296E−02 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

HOE Coefficient

| | S1 | S2 |
|---|---|---|
| HWL | 650 nm | 405 nm |
| C1 | 1.32556E−02 | 0.00000E+00 |
| C2 | −2.98169E−03 | 4.46160E−05 |
| C3 | 2.23090E−03 | 2.10821E−04 |
| C4 | −1.61964E−03 | −2.03611E−05 |
| C5 | 2.74251E−04 | 3.05841E−06 |

Optical surface S1 in a semiconductor laser side of lens L1 is divided first area AREA1 including an optical axis corresponding to an internal area of NA2 and second area AREA2 corresponding from NA2 to NA1 as shown in FIGS. 8(a) to 8(c). First area AREA1 has a structure having diffractive structure HOE1 having plural ring-shaped zones forming a step structure, which is provided centering on an optical axis as shown in FIGS. 3(a) and 3(b).

In diffractive structure HOE1 formed in first area AREA1, the depth of a stepping structure D1 (μm) is set by a value calculated by following formula (15).

$$D1 \times (N1-1)/\lambda 1 = 2 \times q \qquad (15)$$

Dividing number P being a number of steps in each ring-shaped zone is set to 5. Where, λ1 is an expression of a wavelength in a unit of micron of the light flux emitted from first emission point EP1, λ1=0.405 μm, and N1 denotes a refractive index of medium for wave length λ1 and q denotes a natural integer.

When the first light flux having first wavelength of λ1 enters into the stepping structure having depth of D, an optical path difference between adjacent stepping structures of 1×λ1 (μm) occurs. Since no phase difference is given to the first light flux, it passes through the step structure as it is, without being diffracted as the 0th-order diffracted light flux.

When the second light flux having second wavelength λ2, where λ2=0.655 μm, enters into step structure, the optical path difference between adjacent steps of {2×λ1/(N1−1)× (N2−1)/λ2}×λ2={2×0.405/(1.52469−1)×(1.50650−1)/ 0.0.655}×λ2=1.194×λ2 (μm) occurs. Since the dividing number P is set to 5 and one second of the second wavelength λ2 occurs between adjacent ring zones ((1.194-1)× 5≈1, the second light flux is diffracted in the plus first order direction (plus first order diffracted light flux). At that time, the diffraction efficiency of the plus first diffracted light flux of the second light flux becomes 87%. However it is enough light amounts to record and/pr reproduce information onto/ from a DVD.

Depth D2 (μm) of each step between ring-shaped zones which are provided in an aspherical surface of one area corresponding to the optical surface S2 in an optical disc side of lens L1 is set by following formula.

$$D2 \times (N1-1)/\lambda 1 = 5 \qquad (16)$$

When the second light flux having second wavelength λ2 (here λ2=0.655 μm) enters into the step structure, optical path difference of (5×λ1/(N1−1)×(N2−1)/λ2)×λ2 (μm) is generated between adjacent ring-shaped zones. Where, N2 denotes a medium refractive index of lens L1 for wavelength λ2. Since the ratio between λ2/(N2−1) and λ1/(N1−1) is 5 to 3, the optical path difference between adjacent steps is about 3×λ2 (μm). As a result, since substantial phase difference is not given to the second light flux as well as the first light flux, the second light flux passes though the step structure as zero-order diffracted light flux without diffraction.

However, when first wavelength λ1 of the of a semiconductor change to λ1'=0.410 μm from original wavelength 0.405 μm, refractive index of lens L1 for wavelength 0.410 μm is 1.524. Consequently the optical path between adjacent ring-shaped zones is 5×0.405/(1.52469−1)×(1.524−1)/ 0.410)×λ1'=4.933×λ1' (μm). Since the aberration caused by this optical path difference cancels the aberration caused by the total objective lens, the aberration caused by wavelength change is corrected.

Optical surface S2 of lens L1 may be divided into third area AREA3 including an optical axis corresponding to an area of NA2 and fourth area AREA4 corresponding to from NA2 to NA1 as shown in FIGS. 8(a) to 8(c). It becomes possible to increase a degree of design freedom by incorporating plural zone having different phase functions therewith, which is provided centering on an optical axis.

The second objective lens comprises a combination of lens L1 having no phase structure and lens L2. The second objective lens is designed so that the spherical aberration becomes the minimum value by a combination of first wavelength λ1, magnification factor M1=0 and a protective substrate of BD. In this example, when setting first magnification factor M1 for the first light flux and fourth magnification factor M4 for the third light flux to 0 (zero), the spherical aberration becomes a state of a over correction direction without a phase structure due to the spherical aberration caused by the thickness difference between the protective substrate of BD and the protective substrate of DVD.

Each zone width of diffractive structure HOE1 provided on optical surface S1 located in a semiconductor laser light source side of lens L1 is designed to add spherical aberration in an under corrected direction against plus first order diffracted light flux based on diffraction action. The second light flux passed through diffractive structure HOE1 and a protective substrate of BD forms a appropriate light spot on a recording surface of a DVD by canceling spherical aberration in an over-corrected direction caused by the thickness difference between the protective substrate of BD and the protective substrate of DVD.

It becomes possible to make magnification factors M1 and M3 of light flux from one objective lens for two kinds of optical discs by using this diffractive structure HOE. Since comma aberration caused by lens shift of tracking operation when recording and/or reproducing information onto/from the first and the third optical discs, is suppressed, it is a preferable structure. In this example, diffractive structure HOE is provided with lens L1, however diffractive structure HOE may be provided with lens L2.

Further, diffractive structure DOE having plural ring-shaped zones shaped in a sawtooth shape in a cross section including an optical axis may be formed on semiconductor laser light source side optical surface S1 in second area AREA2 or in an optical disc side optical surface S2. The diffractive structure DOE is a structure to suppress chromatic aberration of an objective lens, which is a problem particularly when lens L2 is structured by a plastic lens, and drift of spherical aberration due to the temperature change.

In diffractive structure, height "d1" of a step being the nearest to the optical axis is designed so that the diffraction efficiency of required order of diffracted light flux for wavelength 400 nm-420 nm becomes 100%. When the first light flux enters into diffractive structure DOE 1 in which the depth of the step is set as described above, diffracted light flux occurs with diffraction efficiency of not less than 95%, which is highly enough diffraction efficiency, and it becomes possible to correct chromatic aberration in a blue-violet range.

The second objective lens of the example of the invention does not have diffractive structure DOE, however diffractive structure DOE may be provided on an optical surface of lens L2. Diffractive structure DOE may be a structure, which is provided on an entire optical surface of lens L2 as a one area or an optical surface of lens L2 having diffractive structure DOE thereon may be divided into two areas centering on the optical axis, each of which has a different diffractive structure DOE each other. The diffraction efficiency of the each area, where the first light flux and the second light flux pass through, may be arranged to be balanced. For example, when the height of the step is designed so that the diffraction efficiency becomes 100, (where a refractive index of lens L1 for wavelength 400 nm is 1.5273), it becomes possible to allow plus second diffraction light beams to occur with a diffraction efficiency of 96.8% when the first light flux enters the diffractive structure and to allow the plus first order diffracted light flux to occur with a diffraction efficiency of 93.9% when the second light flux enters the diffractive structure. As a result, the diffraction efficiency can be balanced as described above. Or a structure on which the importance of the diffraction efficiency for the first light flux is attached by optimizing the efficiency against the first wavelength $\lambda 1$.

Further, diffractive structure DOE has a property that when the wavelength of incident light flux become longer, the spherical aberration changes to an under corrected direction and when the wavelength become shorter, the spherical aberration changes to an over corrected direction. Consequently, it is possible to expand the temperature range by canceling spherical aberration changes caused in a condensing element due to environmental temperature changes.

In this example, diffractive structure HOE is provided on semiconductor laser source side optical surface S1 and zone structures are formed on optical disc side optical surface S2. However, it is possible to form zone structures on optical surface S1 and diffractive structure HOE on optical surface S2.

Example 2

The second objective lens comprises plastic lens L1 and glass lens L2. Lens L1 has a diffraction type phase structure on both surfaces. There is provide diffractive structure HOE on a light source side surface S1 of lens L1, which includes plural ring-shaped zones centering on the optical axis, the ring zones having stepping structures as shown in FIGS. 3(a) and 3(b). The phase structure does not diffract but passes the first light flux having wavelength $\lambda 1=405$ nm as zero order diffracted light flux and diffracts the second light flux having wavelength $\lambda 2=780$ nm in a plus first order direction. A zone structure shown in FIGS. 2(a), 2(b), 4(a) and 4(b) is provided on optical disc side surface S2 of lens L1. This phase structure does not diffract but passes the laser beams having wavelength $\lambda 1=405$ nm as well as the light flux having wavelength $\lambda 2=655$ without diffraction. When the wavelength changes from the nominal value used when designed, such as wavelength error of a semiconductor laser, wavelength change of the semiconductor laser due to the temperature rise when the optical pickup apparatus is in an actual use, etc., the ring-shaped zone structure corrects the aberration caused by the wavelength difference or the temperature difference described above. The base surface shape of optical surfaces S1 and S2 are flat.

Lens L2 is a dual face aspherical lens structured by a glass mold and designed so that the spherical aberration determined by the combination of a finite magnification factor determined by the concave surface and a BD protective substrate becomes the minimum value. When setting first magnification factor M1 for the first light flux and the third magnification factor M3 for the second light flux to zero, the second light flux passed through the CD protective substrate becomes an over corrected direction without the phase structure.

Next, the second objective lens will be described in detail below. Lens L1 is a plastic lens having refractive index nd of 1.5091, and Abbe's constant vd of 56.4 for d-line. Refractive index is 1.52469 at $\lambda 1=405$ nm, and refractive index is 1.50650 at $\lambda 2=655$ nm. Lens L2 is a glass mold lens having refractive index nd of 1.68893, and Abbe's constant vd of 31.1 for d-line. Lens data of example 2 is shown in Table 15.

TABLE 15

(Example 2)

| | 405 nm | 655 nm |
|---|---|---|
| Wavelength = | 405 nm | 655 nm |
| NA = | 0.85 | 0.66 |
| OD = | ∞ | ∞ |

| Surface | Curvature Radius | Center Thickness | Refractive Index (405 nm) | Refractive Index (655 nm) |
|---|---|---|---|---|
| 1** | ∞ | 1.000 | 1.52469 | 1.50650 |
| 2** | ∞ | 0.200 | | |
| Stop | ∞ | 0.000 | | |
| 3* | 1.3119 | 2.078 | 1.72955 | 1.68259 |
| 4* | −20.0994 | T4 | | |
| 5 | ∞ | T5 | 1.62100 | 1.58115 |
| 6 | ∞ | | | |

*Aspherical Surface
** HOE Surface

| Variable Interval | | |
|---|---|---|
| | 405 nm | 655 nm |
| T4 | 0.523 | 0.315 |
| T5 | 0.100 | 0.600 |

| Diffraction Order | | |
|---|---|---|
| | 405 nm | 655 nm |
| S1 | Zero Order | First Order |
| S2 | Zero Order | Zero Order |

| Aspherical Surface | | |
|---|---|---|
| | S3 | S4 |
| k | −0.77351 | −1233.34049 |
| A4 | 2.12114E−02 | 1.12859E−01 |
| A6 | 1.74677E−03 | −1.42478E−01 |
| A8 | 1.53783E−03 | 3.95981E−02 |
| A10 | 6.59962E−05 | 3.72951E−02 |
| A12 | −3.34177E−04 | −1.07681E−02 |
| A14 | 2.68656E−04 | −1.83389E−02 |
| A16 | −8.15648E−05 | 6.89594E−03 |
| A18 | 0.00000E+00 | 0.00000E+00 |
| A20 | 0.00000E+00 | 0.00000E+00 |

TABLE 15-continued (Example 2)

HOE Coefficients

| | S1 | S2 |
|---|---|---|
| HWL | 650 nm | 405 nm |
| C1 | 3.09025E−03 | 0.00000E+00 |
| C2 | −2.05172E−03 | −2.14919E−05 |
| C3 | −1.58062E−04 | 3.04017E−05 |
| C4 | −3.74857E−04 | −1.61422E−05 |
| C5 | 6.08432E−05 | 2.67035E−06 |

When combining lens L1 and lens L2 into a single body, it is natural that a separated lens barrel is used to support a lens. However, it is possible to have a structure having a flange on the circumference of the optical functional portion of lens L1, (through which the first light flux passes) and connecting the flange with lens L2 to combine them into one body by welding or adhering.

Semiconductor laser light source side surface S1 of lens L1 is divided into first area AREA1 including an optical axis corresponding to an area of NA2 and second area AREA2 corresponding to from NA2 to NA1 as shown in FIGS. 8(a) to 8(c). First area AREA1 has a structure having diffractive structure HOE1 having plural ring-shaped zones forming a step structure, which is provided centering on an optical axis as shown in FIGS. 3(a) and 3(b).

In diffractive structure HOE1 formed in first area AREA1, the depth of a step structure D (μm) is set by a value calculated by following formula (16).

$$D \times (N1-1)/\lambda 1 = 2 \times q \quad (16)$$

Dividing number P being a number of steps in each ring-shaped zone is set to 5. Where, λ1 is an expression of a wavelength in a unit of micron of the light flux emitted from first emission point EP1, λ1=0.405 μm, and N1 denotes refractive index of medium for wave length λ1 and q denotes a natural integer.

When the first light flux having first wavelength of λ1 enter into the step structure having depth of D1, an optical path difference between adjacent steps of 2×λ1 (μm) occurs. Since no phase difference is given to the first light flux, it passes through the step structure as it is, without being diffracted as zero order diffracted light flux.

When the third light flux having second wavelength λ2, where λ2=0.655 μm, enters into step structure, the optical path difference between adjacent of {2×λ1/(N1−1)×(N2−1)/λ2}×λ2={2×0.405/(1.52469−1)×(1.50650−1)/0.0.655}×λ2=1.194×λ2(μm) occurs. Since the dividing number P is set to 5, an optical path difference being one wavelength of the second wavelength λ2 for the adjacent ring-shaped zones occurs (1.194−1)×5≈1), and the second light flux is diffracted in the plus first order direction (plus first order diffracted light flux). At that time, the diffraction efficiency of the plus first diffracted light flux of the second light flux becomes about 87%, which is enough light amount for recording and/or reading information onto/from DVD.

Depth D2 (μm) of each step between ring-shaped zones which are provided in an aspherical surface of one area corresponding to the optical surface S2 in an optical disc side of lens L1 is set by following formula.

$$D2 \times (N1-1)/\lambda 1 = 5 \quad (17)$$

When the second light flux having second wavelength λ2 (here λ2=0.655 μm) enters into the step structure, optical path difference of (5×λ1/(N1−1)×(N2−1)/λ2)×λ2 (μm) is generated between adjacent ring-shaped zones. Where, N2 denotes a medium refractive index of lens L1 for wavelength λ2. Since the ratio between λ2/(N2−1) and λ1/(N1−1) is 5 to 3, the optical path difference between adjacent steps is about 3×λ2 (μm). As a result, since substantial phase difference is not given to the second light flux as well as the first light flux, the second light flux passes though the step structure as zero-order diffracted light flux without diffraction.

However, when first wavelength λ1 of the of a semiconductor changes to λ1'=0.410 μm from original wavelength 0.410 μm, refractive index of lens L1 for wavelength 0.410 μm is 1.524. Consequently the optical path between adjacent ring-shaped zones is 5×0.405/(1.52469−1)×(1.524−1)/0.410)×λ1'=4.933×λ1' (μm). Since the aberration caused by this optical path difference cancels the aberration caused by the total objective lens, the aberration caused by wavelength change is corrected.

Optical surface S2 of lens L1 may be divided into third area AREA3 including an optical axis corresponding to an area of NA2 and fourth area AREA4 corresponding from NA2 to NA1 as shown in FIGS. 8(a) to 8(c). It becomes possible to increase a flexibility by incorporating plural zone having different phase functions therewith, which is provided centering on an optical axis.

Each zone width of diffractive structure HOE1 provided on optical surface S1 located in a semiconductor laser light source side of lens L1 is designed to add spherical aberration in an under correction direction against plus first order diffracted light flux based on diffraction action. The second light flux passed through diffractive structure HOE1 and a protective substrate of BD forms a appropriate light spot on a recording surface of a DVD by canceling spherical aberration in an over-corrected direction caused by the thickness difference between the protective substrate of BD and the protective substrate of DVD.

It becomes possible to make magnification factors M1 and M3 of light flux from one objective lens for two kinds of optical discs by using this diffractive structure HOE. Since comma aberration caused by lens shift of tracking operation when recording and/or reproducing information onto/from the first and the third optical discs, is suppressed, it is a preferable structure. In this example, diffractive structure HOE is provided with lens L1, however diffractive structure HOE may be provided with lens L2.

Further, diffractive structure DOE having plural ring-shaped zones shaped in a sawtooth shape in a cross section including an optical axis may be formed on semiconductor laser light source side optical surface S1 in second area AREA2 or in an optical disc side optical surface S2. The diffractive structure DOE is a structure to suppress chromatic aberration of an objective lens.

In diffractive structure, height "d1" of a step being the nearest to the optical axis is designed so that the diffraction efficiency of required order of diffracted light flux for wavelength 400 nm-420 nm becomes 100%. When the first light flux enters into diffractive structure DOE 1 in which the depth of the step is set as described above, diffracted light flux occurs with diffraction efficiency of not less than 95%, which is highly enough diffraction efficiency, and it becomes possible to correct chromatic aberration in a blue-violet range.

The second objective lens of the example of the invention does not have diffractive structure DOE, however diffractive structure DOE may be provided on an optical surface of lens L2 other than aforementioned second area AREA2. Diffractive structure DOE may be a structure, which is provided on an entire optical surface of lens L2 as a one area or an optical surface of lens L2 having diffractive structure DOE thereon may be divided into two areas centering on the optical axis, each of which has a different diffractive structure DOE each other. The diffraction efficiency of the each area, where the first light flux and the second light flux passes through, may be arranged to be balanced. For example, when the height of the step is designed so that the diffraction efficiency becomes 100%, (where a refractive index of lens L1 for wavelength 400 nm is 1.5273), it becomes possible to allow plus second diffracted light flux to occur with a diffraction efficiency of 96.8% when the first light flux enters the diffractive structure and to allow the plus first order diffracted light flux to occur with a diffraction efficiency of 93.9% when the second light flux enters the diffractive structure. As a result, the diffraction efficiency can be balanced as described above. Or a structure on which the importance of the diffraction efficiency for the first light flux is attached by optimizing the efficiency against the first wavelength $\lambda 1$.

Further, diffractive structure DOE has a property that when the wavelength of incident light flux becomes longer, the spherical aberration changes to an under corrected direction and when the wavelength become shorter, the spherical aberration changes to an over corrected direction. Consequently, it is possible to expand the temperature range by canceling spherical aberration-changes caused in a condensing element due to environmental temperature changes.

In this example, diffractive structure HOE is provided on semiconductor laser light source side optical surface S1 and ring-shaped zone structures are formed on optical disc side optical surface S2. However, it is possible to form ring shaped zone structures on optical surface S1 and diffractive structure HOE on optical surface S2.

EXAMPLE C

In example C, the first objective lens is exclusive to BD (the first optical disc) and the second objective lens is common to HD (the second optical disc), DVD (the third optical disc), and CD (the fourth optical disc).

The first objective lens of example 1 of example C will be described below.

The first objective lens comprises single lens L1 structured by glass material and both surfaces, light source side surface S1 and optical disc side surface S2 have aspherical surface. Single lens L1 has refractive index nd of 1.1.6935, and Abbe's constant vd of 53.2 for d-line. The refractive index is 1.71157 at $\lambda 1=405$ nm. Lens data of example 1 is shown in Table 16.

TABLE 16

(Example 1)

| Wavelength = | 405 nm |
| NA = | 0.85 |
| OD = | ∞ |

| Surface | Curvature Radius | Center Thickness | Refractive Index (405 nm) |
| --- | --- | --- | --- |
| 1* | 1.0441 | 1.600 | 1.71557 |
| 2* | −11.2393 | 0.447 | |

TABLE 16-continued (Example 1)

| 3 | ∞ | 0.100 | 1.61950 |
| 4 | ∞ | | |

*Aspherical Surface Coefficient

Aspherical Coefficient

| | S1 | S2 |
| --- | --- | --- |
| k | −0.61997 | 97.11742 |
| A4 | 2.48118E−02 | 4.25867E−01 |
| A6 | 2.55383E−03 | −9.17310E−01 |
| A8 | 1.95635E−02 | 1.05361E+00 |
| A10 | −1.26829E−02 | −6.51601E−01 |
| A12 | 7.73815E−05 | 1.69925E−01 |
| A14 | 8.32108E−03 | 0.00000E+00 |
| A16 | −4.35796E−03 | 0.00000E+00 |
| A18 | 0.00000E+00 | 0.00000E+00 |
| A20 | 0.00000E+00 | 0.00000E+00 |

The second objective lens of example 1 which can be combined with the first objective lens in example C will be described below.

Example 1

The second objective lens comprises plastic lens L1.

There are provided diffractive structures DOE1 and DOE2 having a structure of arrayed plural ring-shaped zones centering on optical axis, the plural ring-shaped zones having step structures shaped in a sawtooth shape on light source side surface S1 of lens L1 as shown in cross sectional view of FIGS. 1(a) and 1(b). The light source side surface S1 has two areas centering on an optical axis. Diffractive structure DOE1 diffracts the light flux having the first wavelength $\lambda 1=407$ nm as tenth order diffracted light flux, the second light flux having wavelength $\lambda 2=655$ nm as sixth order diffracted light flux and the third light flux having wavelength $\lambda 3=785$ nm as fifth diffracted light flux. On the other hand, diffractive structure DOE2, which is different from the diffractive structure in the aforementioned area, provided in outside area of NA3, diffracts the light flux with the first wavelength $\lambda 1=407$ nm as fifth order diffracted light flux and the second light flux having wavelength $\lambda 2=655$ nm as third order diffracted light flux. The surface type being a base of light source side surface S1 and optical disc side surface S2 is an aspherical surface respectively having two areas. An outer axis characteristic for CD reproduction is particularly improved by providing the two areas. It is designed that the light flux having wavelength $\lambda 1$ and the light flux having wavelength $\lambda 2$ enter into lens L1 as converging light flux and the light flux wavelength $\lambda 3$ entires into lens L1 as a divergent light flux. Lens data of example 1 is shown in Table 17.

TABLE 17

(Example 1)
Lens Data

| Objective lens focal length | $f_1$ = 3.00 mm | $f_2$ = 3.10 mm | $f_3$ = 3.12 mm |
| Image Surface Side Numerical Aperture | NA1: 0.65 | NA2: 0.65 | NA3: 0.51 |

TABLE 17-continued

| | | | | | | |
|---|---|---|---|---|---|---|
| Diffraction Order of 2nd Surface | | n1: 10 | | n2: 6 | | n3: 5 |
| Diffraction Order of 2'th Surface | | n1: 5 | | n2: 3 | | |
| Magnification Factor | | m1: 1/31.0 | | m2: 1/54.3 | | m3: −1/29.9 |

| *1 | di (407 nm) | ni (407 nm) | di (655 nm) | ni (655 nm) | di (785 nm) | ni (785 nm) |
|---|---|---|---|---|---|---|
| 0 | −90.00 | | −166.02 | | 96.40 | |
| 1 | ∞ | | 0.01 | | 0.01 | |
| *2 | | | (φ3.964 mm) | | (φ3.288 mm) | |
| 2 | 1.92355 | 1.65000 | 1.558906 | 1.65000 | 1.540725 | 1.65000 | 1.537237 |
| 2' | 1.98118 | 0.00583 | 1.559806 | 0.00583 | 1.540725 | 0.00583 | 1.537237 |
| 3 | −16.03440 | 1.55 | 1.0 | 1.67 | 1.0 | 1.47 | 1.0 |
| 3' | −13.18912 | 0.00000 | 1.0 | 0.00000 | 1.0 | 0.00000 | 1.0 |
| 4 | ∞ | 0.6 | 1.61869 | 0.6 | 1.57752 | 1.2 | 1.57063 |
| 5 | ∞ | | | | | | |

*1: i-th Surface
*2: (Diaphragm Radius)
*di denotes a displacement from i-th Surface to i + 1-th Surface.
*d2' denotes displacement from 2-nd Surface to 2'th Surface, and d3' denotes displacement from 3-rd Surface to 3'th Surface.

Aspherical Surface Data

The 2nd surface (0 < h ≦ 1.662 nm: HD DVD/DVD/CD common area)
Aspherical Surface Coefficient

| κ | −4.4662 × E−1 | | |
|---|---|---|---|
| A1 | +8.7126 × E−4 | P1 | 4.0 |
| A2 | −1.9063 × E−3 | P2 | 6.0 |
| A3 | +9.2646 × E−4 | P3 | 8.0 |
| A4 | −2.1198 × E−4 | P4 | 10.0 |
| A5 | +1.6273 × E−7 | P5 | 12.0 |
| A6 | +1.3793 × E−6 | P6 | 14.0 |

An Optical Difference Function
(Blaze wavelength 417 nm)

| C2 | −9.6498E−05 |
|---|---|
| C4 | −8.3988E−06 |
| C6 | −3.1284E−06 |
| C8 | 5.6541E−07 |
| C10 | −1.7042E−07 |

The 2'th surface
(0 < h ≦ 1.662 nm: HD DVD/DVD/CD common area)
Aspherical Surface Coefficient

| κ | −4.1961 × E−1 | | |
|---|---|---|---|
| A1 | +3.0725 × E−3 | P1 | 4.0 |
| A2 | −2.5861 × E−3 | P2 | 6.0 |
| A3 | +9.6551 × E−4 | P3 | 8.0 |
| A4 | −1.3826 × E−4 | P4 | 10.0 |
| A5 | +7.5482 × E−6 | P5 | 12.0 |
| A6 | −7.5795 × E−7 | P6 | 14.0 |

An Optical Difference Function
(Blaze wavelength 417 nm)

| C2 | −2.2814E−04 |
|---|---|
| C4 | −1.1010E−05 |
| C6 | −6.4735E−06 |
| C8 | −4.2984E−07 |
| C10 | 4.7450E−07 |

The 3rd surface (0 < h ≦ 1.362 nm: HD DVD/DVD/CD common area)
Aspherical Surface Coefficient

| κ | −8.0653 × E+2 | | |
|---|---|---|---|
| A1 | −5.5926 × E−3 | P1 | 4.0 |
| A2 | +1.1660 × E−2 | P2 | 6.0 |
| A3 | −6.4291 × E−3 | P3 | 8.0 |
| A4 | +1.5528 × E−3 | P4 | 10.0 |
| A5 | −1.3029 × E−4 | P5 | 12.0 |
| A6 | −3.4460 × E−6 | P6 | 14.0 |

TABLE 17-continued

The 3'th surface (0 < h ≦ 1.362 nm: HD DVD/DVD/CD common area)
Aspherical Surface Coefficient

| κ | −1.2782 × E+3 | | |
|---|---|---|---|
| A1 | −7.3881 × E−3 | P1 | 4.0 |
| A2 | +1.1800 × E−2 | P2 | 6.0 |
| A3 | −6.0862 × E−3 | P3 | 8.0 |
| A4 | +1.6068 × E−3 | P4 | 10.0 |
| A5 | −2.3565 × E−4 | P5 | 12.0 |
| A6 | +1.5370 × E−5 | P6 | 14.0 |

Further, a diffractive structure having plural ring-shaped zones shaped in a sawtooth shape in a cross section including an optical axis may be formed in first area AREA1 and second area AREA2 in semiconductor laser light source side and optical surface S2 in an optical disc side of Lens L1. Diffractive structure is called DOE hereinafter.

Diffractive structures DOE1 and DOE2 are diffractive structures to record and/or reproduce information by using the light flux-having three different wavelengths. Further, diffractive structure is a structure to suppress chromatic aberration of objective optical system OBJ in a blue-violet region and spherical aberration drift due to the temperature change when lens L1 comprises a plastic lens.

In diffractive structure, height "d" of a step being the nearest to the optical axis is designed so that the diffraction efficiency of required order of diffracted light flux for wavelength 400 nm-420 nm becomes 100%. When the first light flux enters into diffractive structure DOE in which the depth of step is set as described above, diffracted light flux occurs with diffraction efficiency of not less than 95%, which is highly enough diffraction efficiency, and it becomes possible to correct chromatic aberration in a blue-violet range.

In diffractive structure, height "d1" of a step being the nearest to the optical axis is designed so that the diffraction efficiency of required order of diffracted light flux for wavelength 400 nm-420 nm becomes 100%. (The refractive index of lens L1 for wavelength of 400 nm is 1.559806.) When the first light flux enters into diffractive structure DOE1 in which the depth of the step is set as described above, plus first order diffracted light flux occurs with diffraction efficiency of not less than 93.9%, which is highly enough diffraction efficiency in any wavelength range. Even when the chromatic aberration in a blue-violet range is corrected, chromatic aberration correction in the wavelength of the second light flux range is not over corrected. In this example, it is designed that the diffraction efficiencies of the first light flux and the second light flux are balanced. However, importance may be placed on the diffraction efficiency on the first light flux.

The objective lens in this example does not have diffractive structure DOE on optical disc side optical surface S2. However diffractive structure DOE may be provided on optical surface S2. In this case, diffractive structure DOE may be provided over the surface of lens L1, where diffractive structure has been provided, as a one area. Or different diffractive structure DOEs may be provided on two or three concentric circle shape areas centering on the optical axis. In this case, it may be designed that diffraction efficiencies of the first, the second and third light fluxes in the area where the first, the second and third light fluxes commonly pass, is balanced. It may be designed that diffraction efficiencies of the first and the second light fluxes in the area where the first and the second light fluxes commonly pass, is balanced. A structure to put importance on the first light flux diffraction efficiency may be designed.

Further, diffractive structures DOE1 and DOE2 have property that when the wavelength of incident light beams become longer, the spherical aberration changes to an under correction direction and when the wavelength become shorter, the spherical aberration changes to a correction direction. Consequently, it is possible to expand the temperature range by canceling spherical aberration changes caused in a condensing element due to environmental temperature changes.

EXAMPLE D

In example D, the first objective lens is exclusive to HD (the second optical disc) and the second objective lens is commonly used for BD (the first optical disc), DVD (the third optical disc) and CD (the fourth optical disc).

Example 1 of the first objective optical disc in example D will be described below.

Example 1

The first objective lens comprises a single lens L1 structured by plastic material. Light source side surface S1 and optical disc side surface S2 of the first objective optical disc are aspherical surfaces. Refractive index for wavelength $\lambda 1=407$ nm is 1.543. Lens data of example 1 is shown in Table 18.

TABLE 18

(Example 1)
Lend Data

| Focal Length | $f_1 = 3.2$ mm |
|---|---|
| Image Surface Side Numerical Aperture | NA1: 0.65 |
| Diffraction Order of 2nd Surface | n1: 3 |
| Magnification Factor | m1: 0 |

| i-th Surface | ri | di(407 nm) | ni(407 nm) |
|---|---|---|---|
| 0 | ∞ | | |
| 1 (Diaphragm Radius) | ∞ | 0.1(φ4.16 mm) | |
| 2 | 2.02108 | 1.90000 | 1.542771 |
| 3 | −9.54846 | 1.75 | 1.0 |
| 4 | ∞ | 0.6 | 1.61869 |
| 5 | ∞ | | |

*di denotes a displacement from i-th Surface to i + 1-th Surface.

TABLE 18-continued

Aspherical Surface Data
The second surface

Aspherical Surface Coefficient

| κ  | −4.4201 × E−1 |    |      |
|----|---------------|----|------|
| A1 | −6.6218 × E−4 | P1 | 4.0  |
| A2 | −1.4866 × E−3 | P2 | 6.0  |
| A3 | +5.2339 × E−4 | P3 | 8.0  |
| A4 | −1.0140 × E−4 | P4 | 10.0 |
| A5 | +8.5260 × E−6 | P5 | 12.0 |
| A6 | −1.1279 × E−6 | P6 | 14.0 |

An Optical Difference Function
(Blaze wavelength 407 nm)

| C2  | −1.0575E−03 |
| C4  | −1.1481E−04 |
| C6  | −1.1143E−04 |
| C8  |  2.1420E−05 |
| C10 | −2.1247E−06 |

The third surface
Aspherical Surface Coefficient

| κ  | −1.7944 × E+2 |    |      |
|----|---------------|----|------|
| A1 | −9.8565 × E−3 | P1 | 4.0  |
| A2 | +1.1687 × E−2 | P2 | 6.0  |
| A3 | −5.1568 × E−3 | P3 | 8.0  |
| A4 | +1.1684 × E−3 | P4 | 10.0 |
| A5 | −1.4004 × E−4 | P5 | 12.0 |
| A6 | +7.0266 × E−6 | P6 | 14.0 |

The second objective lens of example 1, which can be combined with the first objective lens in example D will be described below.

Example 1

The second objective lens comprises a plastic lens L1 and a glass lens L2.

Lens L1 has diffraction type of phase structures on both optical surfaces. There is provided diffractive structure HOE which is a structure having arrayed plural ring-shaped zones centering on an optical axis, which have step structures shown in FIGS. 3(a)-3(b) on both surfaces, light source side S1 and optical disc side surface S2 of lens L1. This phase structure passes the first light flux having wavelength λ1=408 nm as zero order light flux and diffracts the second light flux having wavelength λ2=658 nm and the third light flux having a wavelength λ3=785 nm in the first order direction. The base surface shapes of light source side surface S1 and optical disc side surface S2 are flat plate shapes.

Lens L2 is a dual face aspherical lens structured by glass mold and designed so that the spherical aberration determined by the combination with magnification factor M1=0 and a protective substrate of BD becomes the minimum value. Consequently, when setting second magnification factor M2 for the thirst light flux, third magnification factor M3 for the second light flux and the fourth magnification factor M4 for the third light flux to zero, the second light flux and the third light flux passed through respectively the objective lens and the protective substrate of DVD, and the objective lens and the protective substrate of CD, become an over corrected direction without the phase structure due to the thickness difference between the protective substrate of BD and the protective substrate of DVD, and between the protective substrate of BD and protective substrate of CD.

Next, the second objective lens will be described in detail below. Lens L1 is a plastic lens having refractive index nd of 1.5091 for d-line, Abbe's constant νd of 56.4, refractive index of 1.52469 at λ1=405 nm and refractive index of 1.50650 at λ2=655 nm. Lens L2 is a glass lens having refractive index nd of 1.6935 for d-line, and Abbe's constant νd of 53.2. When combining lens L1 and lens L2 into a single body, it is natural that a separated lens barrel is used to support a lens. However, it is possible to have a structure having a flange on the circumference of the optical functional portion of lens L1, (through which the first light flux passes) and connecting the flange with lens L2 to combine them into one body by welding or adhering. The lens data of lenses used in example 1 is shown in Table 19.

TABLE 19

(Example 1)

| Wavelength = | 408 nm | 658 nm | 785 nm |
|---|---|---|---|
| NA = | 0.65 | 0.65 | 0.45 |
| OD = | ∞ | ∞ | ∞ |

| Surface | Curvature Radius | Center Thickness | Refractive Index (408 nm) | Refractive Index (658 nm) | Refractive Index (785 nm) |
|---|---|---|---|---|---|
| Stop | ∞ | 0.500 | | | |
| 1*** | −12.3047 | 0.700 | 1.52424 | 1.50642 | 1.50324 |
| 2** | ∞ | 0.100 | | | |
| 3* | 1.2326 | 1.790 | 1.71493 | 1.68946 | 1.68450 |
| 4* | −5.3193 | T4 | | | |
| 5 | ∞ | T5 | 1.62110 | 1.57975 | 1.57326 |
| 6 | ∞ | | | | |

*Aspherical Surface
**HOE Surface (Flat Surface)
***HOE Surface (Aspherical Surface)

|  | 408 nm | 658 nm | 785 nm |
|---|---|---|---|

Variable Interval

| T4 | 0.671 | 0.459 | 0.350 |
| T5 | 0.100 | 0.600 | 1.200 |

Diffraction Order

| S1 | Zero Order | First Order | Zero Order |
| S2 | Zero Order | Zero Order | First Order |

Aspherical Surface Coefficient

|     | S1 | S3 | S4 |
|-----|----|----|----|
| k   | 34.28186 | −0.65831 | −357.81531 |
| A4  | 2.22181E−03 | 1.52224E−02 | 6.10895E−02 |
| A6  | 4.73698E−04 | −3.81262E−03 | −2.24309E−02 |
| A8  | −9.99250E−05 | 5.45095E−03 | −5.68441E−03 |
| A10 | 4.44414E−05 | 6.17336E−04 | −8.67093E−04 |
| A12 | 0.00000E+00 | −2.84138E−04 | 2.62805E−03 |
| A14 | 0.00000E+00 | 2.30047E−04 | −2.21754E−04 |
| A16 | 0.00000E+00 | 3.99225E−05 | −1.95820E−04 |
| A18 | 0.00000E+00 | 2.51028E−06 | 0.00000E+00 |
| A20 | 0.00000E+00 | −1.75173E−05 | 0.00000E+00 |

HOE Coefficients

|     | S1 | S2 |
|-----|----|----|
| HWL | 658 nm | 785 nm |
| C1  | 1.01986E−02 | 4.66215E−02 |
| C2  | −2.86245E−03 | −4.51310E−03 |
| C3  | 5.60156E−04 | 1.16932E−02 |
| C4  | −1.16648E−03 | −1.06173E−02 |
| C5  | 1.62918E−04 | 4.28793E−03 |

Optical surface S1 in a semiconductor laser side of lens L1 is divided into first area AREA1 including an optical axis corresponding to an internal area of NA2 and second area AREA2 corresponding from NA2 to NA1 as shown in FIGS. 8(a) to 8(c). First area AREA1 has a structure having diffractive structure HOE1 having plural ring-shaped zones forming a step structure, which is provided centering on an optical axis as shown in FIGS. 3(a) and 3(b).

In diffractive structure HOE1 formed in first area AREA1, the depth of a stepping structure D1 (μ) is set by a value calculated by following formula (20).

$$D1 \times (N1-1)/\lambda 1 = 2 \times q \tag{20}$$

Dividing number P being a number of steps in each ring-shaped zone is set to 5. Where, λ1 is an expression of a wavelength in a unit of micron of the light flux emitted from first emission point EP1, λ1=0.405 μm, and N1 denotes a refractive index of medium for wavelength λ1 and q denotes a natural integer.

When the first light flux having first wavelength of λ1 enters into the stepping structure having depth of D, an optical path difference between adjacent steps of 1×λ1 (μm) occurs. Since no phase difference is given to the first light flux, it passes through the step structure as it is, without being diffracted as zero order diffracted light flux.

When the third light flux having third wavelength λ3, where λ2=0.785 μm, enters into the step structure, the optical path difference between adjacent steps of {2×λ1/(N1−1)×(N3−1)/3}×λ3(μm) occurs. Where, N3 denotes a medium refractive index of lens L1 for wavelength λ3. Since the ratio between (N3−1)/λ3 and (N1−1)/λ1 is about 2 to 1, the optical path difference between adjacent steps of about 1×λ3 (μm) is generated. Since substantial phase difference is not given to the third light flux as well as the first light flux, the third light flux is not diffracted but passes through as zero order diffracted light flux without diffraction.

When the second light flux having second wavelength λ2, where λ2=0.658 μm, enter into step structure, the optical path difference between adjacent steps of {2×λ1/(N1−1)×(N2−1)/λ2}×λ2={2×0.408/(1.5242−1)×(1.5064−1)/0.658}×λ2=1.199×λ2(μm) occurs. Since the dividing number P is set to 5 and one second of the second wavelength λ2 occurs between adjacent ring-shaped zones ((1.199−1)×5≈1), the second light flux is diffracted in the plus first order direction (plus first order diffracted light flux). At that time, the diffraction efficiency of the plus first diffracted light flux of the second light flux becomes 87.5%. However it is enough light amounts to record and/or reproduce information onto/from a DVD.

Optical surface S2 of lens L1 is divided into first area AREA3 including an optical axis corresponding to an area of NA3 and second area AREA4 corresponding to from NA3 to NA1 as shown in FIGS. 8(a) to 8(c). First area AREA3 has a structure having diffractive structure HOE 2 having plural ring-shaped zones forming a step structure, which is provided centering on an optical axis as shown in FIGS. 3(a) and 3(b).

In diffractive structure HOE 2 formed in third area AREA3, the depth of a step structure D (μm) is set by a value calculated by following formula (21).

$$D \times (N1-1)/\lambda 1 = 5 \times q \tag{21}$$

Dividing number P being a number of steps in each ring-shaped zone is set to 2. Where, λ1 is an expression of a wavelength in a unit of micron of the light flux emitted from first emission point EP1, λ1=0.405 μm, and N1 denotes a refractive index of medium for wave length λ1 and q denotes a natural integer.

When the first light flux having first wavelength of λ1 enter into the step structure having depth of D, an optical path difference between adjacent steps of 5×λ1 (μm) occurs. Since no phase difference is given to the first light flux, it passes through the step structure as it is, without being diffracted as a zero order diffracted light flux.

When the second light flux having second wavelength λ2, where λ2=0.658 μm, enter into the stepping structure, the optical path difference between adjacent steps of {5×λ1/(N1−1)×(N2−1)/λ2}×λ2(μm) occurs. Where, N2 denotes a medium refractive index of lens L1 for wavelength λ2. Since the ratio between (N2−1)/2 and (N1−1)/λ1 is about 5 to 3, the optical path difference between adjacent steps of about 3×λ2 (μm) is generated. Since substantial phase difference is not given to the third light flux as well as the first light flux, the third light flux is not diffracted but pass through as zero order diffracted light flux without diffraction.

When the third light flux having third wavelength λ3, where λ3=0.785 μm, enters into step structure, the optical path difference between adjacent steps of {5×λ1/(N1−1)×(N3−1)/λ3}×λ3={5×0.408/(1.5242−1)×(1.5050−1)/0.785}×λ3=2.5×λ3(μm) occurs. Since the dividing number P is set to 2, the third light flux is diffracted in the plus/minus first order direction (plus first diffracted light flux and minus first diffracted light flux). At that time, the diffraction efficiency of the plus first diffracted light flux of the second light flux is a little over 40%, and minus first order diffracted light flux becomes flare light.

It is possible to improve the diffraction efficiency of plus first order diffracted light flux by optimizing the slant made between a surface of the step shape parallel with an optical axis and a surface not being in parallel to the optical axis, for example, by deforming the surface not being in parallel to the optical axis to a surface which is deemed to be a preferable from the point of wavefront aberration. It is also possible to raise the efficiency by changing the medium dispersion of the material forming lens L1 and dividing number P of the step shape.

Lens L2 is designed so that the spherical aberration determined by the combination with the first wavelength λ1 and a protective substrate of BD becomes the minimum value. When setting first magnification factor M1 for the first light flux, third magnification factor M3 for the second light flux and the fourth magnification factor M4 for the third light flux to zero, the spherical aberration of the second light flux passed through lens L2 and DVD protective substrate, and spherical aberration of the third light flux passed through lens L2 and protective substrate of CD changes an over corrected direction due to the thickness differences between a protective substrate of BD and a DVD protective substrate and a protective substrate of CD.

Each ring-shaped zone width of diffractive structure HOE1 provided on optical surface S1 in a semiconductor laser light source side of lens L1 and of diffractive structure HOE2 provided on optical surface S2 in an optical disc side of lens L1 are designed to add spherical aberration in an under corrected direction against plus first order diffracted light flux based on diffractive action. The second light flux passed through diffractive structure HOE1 and a DVD protective substrate forms a appropriate light spot on a recording surface of a DVD by canceling spherical aberration in an over-corrected direction caused by the thickness difference between the protective substrate of BD and the protective substrate of DVD and the protective substrate of CD. The third light flux passed through diffractive structure HOE2 and protective substrate of CD forms an appropriate light spot on a recording surface of a CD.

It becomes possible to allow magnification factors M1, M3 and M4 to be 0 (zero) while one objective lens covers three kinds of optical discs by using two faces of diffractive structure HOE as described above. Since a comma aberration problem caused by lens shift associated with tracking operation when recording and/or reproducing information onto/from all optical discs from the first optical disc to the third optical disc can be solved, it is a preferable structure.

Further, diffractive structure HOE is provide both surfaces of lens L1 in this example, however at least one diffractive structure HOE may be provide on lens L2. As long as two faces of diffractive structure HOE are provide, the same effects can be obtained.

Further, a diffractive structures DOE1 and DOE2 having plural ring-shaped zones shaped in a sawtooth shape in a cross section including an optical axis may be formed in second area AREA2 or fourth area AREA4 in semiconductor laser light source side and optical surface S2 in an optical disc side of Lens L1.

Diffractive structure DOE1 is a structure to suppress chromatic aberration of objective optical lens OBJ in a blue-violet range which becomes a problem when lens L2 is structured by a plastic lens. Diffractive structure DOE2 is a structure to suppress chromatic aberration of objective optical lens OBJ in a blue-violet and a red ranges which becomes a problem when lens L2 is structured by a plastic lens and spherical aberration drift associated with the temperature change.

In diffractive structure, height "d" of a step being the nearest to the optical axis is designed so that the diffraction efficiency of required order of the diffracted light flux for wavelength 400 nm-420 nm becomes 100%. When the first light flux enters into diffractive structure DOE1 in which the depth of step is set as described above, a diffracted light flux occurs with diffraction efficiency of not less than 95%, which is highly enough diffraction efficiency, and it becomes possible to correct chromatic aberration in a blue-violet range.

In diffractive structure DOE2, height "d1" of a step being the nearest to the optical axis is designed so that the diffraction efficiency of required order of diffracted light flux for wavelength 400 nm-420 nm becomes 100%. (The Diffractive index of lens L1 for wavelength of 400 nm is 1.559806.) When the first light flux enters into diffractive structure DOE1 in which the depth of the step is set as described above, plus first order diffracted light flux occurs with diffraction efficiency of not less than 93.9%, which is highly enough diffraction efficiency in any wavelength range. Even when the chromatic aberration in a blue-violet range is corrected, chromatic aberration correction in the wavelength of the second light flux range is not over corrected. In this example, it is designed that the diffraction efficiencies of the first light flux and the second light flux are balanced. However, importance may be placed on the diffraction efficiency on the first light flux.

The objective lens of the example of the invention does not have diffractive structure DOE, however diffractive structure DOE may be provided on an optical surface of lens L2 other than aforementioned second area AREA2 and fourth area AREA4. Diffractive structure DOE may be a structure, which is provided on an entire optical surface of lens L2 as a one area or an optical surface of lens L2 having diffractive structure DOE thereon may be divided into two or three areas centering on the optical axis, each of which has a different diffractive structure DOE each other. The diffraction efficiency of the each area, where from the first light flux to the third light flux passes through, may be arranged to be balanced. For example, when the height of the step is designed so that the diffraction efficiency becomes 100%, (where a refractive index of lens L1 for wavelength 400 nm is 1.5273), it becomes possible to allow plus second diffraction light beams to occur with a diffraction efficiency of 96.8% when the first light beams enter the diffractive structure, the plus first order diffracted light flux to occur with a diffraction efficiency of 93.9% when the light flux beams enter the diffractive structure and the plus first order diffracted light flux with a diffraction efficiency of 99.2% when the third light flux enters the diffractive structure. As a result, the diffraction efficiency can be balanced as described above. Or a structure on which the importance of the diffraction efficiency for the first light flux is attached by optimizing the efficiency against the first wavelength $\lambda 1$.

Further, diffractive structures DOE1 and DOE2 have properties that when the wavelength of incident light flux becomes longer, the spherical aberration changes to an under corrected direction and when the wavelength of the light flux becomes shorter, the spherical aberration changes to an over corrected direction. Consequently, it is possible to expand the temperature range of a plastic and high NA objective lens by canceling spherical aberration changes caused in a conversing element due to environmental temperature changes.

In this example, diffractive structure HOE is provided on semiconductor laser light source side optical surface S1 and zone structures DOE are formed on optical disc side optical surface S2. However, it is possible to form diffractive structure DOE on optical surface S1 and diffractive structure HOE on optical surface S2.

According to the present invention, it becomes possible to provide an optical pickup apparatus having an objective lens being compact and being capable of appropriately recording and/or reproducing information onto/from at least two types of high density optical disks having protective substrates with different thicknesses each other.

What is claimed is:

1. An optical pickup apparatus for conducting at least recording or reproducing of information on two types of optical information recording media having protective substrates with different thicknesses, comprising:

a first light source for emitting a first light flux with a wavelength $\lambda 1$;

a first objective lens for converging the first light flux from the first light source on an information recording surface of a first optical information recording medium having a protective substrate with a thickness t1 when the optical pickup apparatus reproduces or records information for the first optical information medium; and a second objective lens for converging the first light flux from the first light source on an information recording surface of a second optical information recording medium having a protective substrate with a thickness t2 (t2≠t1) when the optical pickup apparatus reproduces or records information for the second optical information medium, wherein the optical pickup apparatus satisfies:

$$0.8 \leq (f1 \times NA1)/(f2 \times NA2) \leq 1.2,$$

where NA1 is a numerical aperture of the first objective lens when the optical pickup apparatus reproduces information on the first optical information recording medium, f1 is a focal length of the first objective lens when the optical pickup apparatus reproduces information on the first optical information recording medium, NA2 is a numerical aperture of the second objective lens when the optical pickup apparatus reproduces information on the second optical information recording medium, and f2 is a focal length of the second objective lens when the optical pickup apparatus reproduces information on the second optical information recording medium.

2. The optical pickup apparatus of claim 1, further comprising:

a second light source for emitting a second light flux with a wavelength $\lambda 2$ ($\lambda 2 > \lambda 1$), wherein one of the first objective lens and the second objective lens converges the second light flux from the second light source on an information recording surface of a third optical information recording medium having a protective substrate with a thickness t3 (t3≠t1) when the optical pickup apparatus reproduces or records information for the third optical information medium.

3. The optical pickup apparatus of claim 2, further comprising:

a third light source for emitting a third light flux with a wavelength $\lambda 3$ ($\lambda 3 < \lambda 2$), wherein one of the first objective lens and the second objective lens converges the third light flux from the third light source on an information recording surface of a fourth optical information recording medium having a protective substrate with a thickness t4 (t4≠t1, t4≠t2) when the optical pickup apparatus reproduces or records for the fourth optical information medium.

4. The optical pickup apparatus of claim 1, further comprising:

a switching element for switching an optical path of the first light flux from the first light source such that the first light flux enters into one of the first objective and the second objective lens corresponding to an optical information recording medium to be used.

5. The optical pickup apparatus of claim 4, wherein the switching element comprises an actuator for selectively inserting the first objective lens or the second objective lens in an optical path where a light flux from the first light source passes through.

6. The optical pickup apparatus of claim 1, satisfying 2.5<t2/t1, where t1 is a thickness of the protective substrate of the first optical information recording medium, and t2 is a thickness of the protective substrate of the second optical information recording medium.

7. The optical pickup apparatus of claim 1, further comprising:

a collimate lens arranged in an optical path from the first light source to the first objective lens or the first light source to the second objective lens, wherein the collimate lens is commonly used for recording or reproducing information for the first optical information recording medium and for recording or reproducing information for the second optical information recording medium.

8. The optical pickup apparatus of claim 1, wherein the first optical information recording medium is an optical disk for BLU-RAY DISC, and the second optical information recording medium is an optical disk for HD DVD.

* * * * *